US011003340B2

(12) United States Patent
Kawashima et al.

(10) Patent No.: US 11,003,340 B2
(45) Date of Patent: May 11, 2021

(54) DISPLAY DEVICE

(71) Applicant: Panasonic Intellectual Property Management Co., Ltd., Osaka (JP)

(72) Inventors: Masahiro Kawashima, Tokyo (JP); Kenji Fujiune, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/662,159

(22) Filed: Oct. 24, 2019

(65) Prior Publication Data
US 2020/0073538 A1 Mar. 5, 2020

Related U.S. Application Data

(63) Continuation of application No. PCT/JP2018/014515, filed on Apr. 5, 2018.

(30) Foreign Application Priority Data

Apr. 28, 2017 (JP) .............................. JP2017-090470

(51) Int. Cl.
*G06F 3/0484* (2013.01)
*G06F 3/041* (2006.01)
(Continued)

(52) U.S. Cl.
CPC ........ *G06F 3/04845* (2013.01); *G06F 3/0412* (2013.01); *G06F 3/0488* (2013.01);
(Continued)

(58) Field of Classification Search
CPC ......... G06F 2203/04806; G06F 3/0412; G06F 3/04845; G06F 3/0488; G06F 3/04883;
(Continued)

(56) References Cited

U.S. PATENT DOCUMENTS 8,427,445 B2 * 4/2013 Kennedy ............... G06F 3/0414
345/173
10,664,144 B2 * 5/2020 Weeldreyer ......... G06F 3/04845
(Continued)

FOREIGN PATENT DOCUMENTS

JP 9-44330 2/1997
JP 4708203 6/2011
(Continued)

OTHER PUBLICATIONS

International Search Report dated May 15, 2018 in International (PCT) Application No. PCT/JP2018/014515.

*Primary Examiner* — Dmitriy Bolotin
(74) *Attorney, Agent, or Firm* — Wenderoth, Lind & Ponack, L.L.P.

(57) ABSTRACT

A display device includes a display part, a storage stores original image data of an original image, a detector detects a touch operation being performed on a screen of the display part, and outputs touch position information indicating a touch position, and a controller displays a base image by resizing the original image according to a display resolution of the display part on the display part. When the touch operation is detected, the controller determines an enlargement target area that is a part of area on the base image including a position corresponding to the touch position, resizes and cuts an area on the original image to generate a partial enlarged image in which the enlargement target area is enlarged, the area corresponding to the enlarged target area, and display the base image and the partial enlarged image which is displayed over a part of the base image.

22 Claims, 23 Drawing Sheets

(51) Int. Cl.
*G06F 3/0488* (2013.01)
*G06T 3/40* (2006.01)
*G09G 5/02* (2006.01)
*G09G 5/391* (2006.01)

(52) U.S. Cl.
CPC ............... *G06T 3/40* (2013.01); *G09G 5/02* (2013.01); *G09G 5/391* (2013.01); *G06F 2203/04806* (2013.01)

(58) Field of Classification Search
CPC ........ G06T 3/40; G09G 2340/14; G09G 5/00; G09G 5/02; G09G 5/10; G09G 5/14; G09G 5/36; G09G 5/363; G09G 5/377; G09G 5/391
See application file for complete search history.

(56) References Cited

U.S. PATENT DOCUMENTS

| | | | |
|---|---|---|---|
| 2009/0237371 A1* | 9/2009 | Kim | G06F 3/04817 345/173 |
| 2014/0092397 A1* | 4/2014 | Yamamoto | G06T 3/0018 358/1.2 |
| 2014/0192022 A1* | 7/2014 | Yamamoto | G06F 3/0488 345/174 |
| 2015/0052476 A1 | 2/2015 | Nakao | |
| 2015/0212641 A1* | 7/2015 | Tanneberger | G06F 3/0418 345/173 |
| 2015/0253968 A1* | 9/2015 | Joo | G06F 3/0488 715/798 |

FOREIGN PATENT DOCUMENTS

| | | |
|---|---|---|
| JP | 2013-225261 | 10/2013 |
| JP | 2014-71854 | 4/2014 |
| JP | 2015-170365 | 9/2015 |
| JP | 2016-26307 | 2/2016 |
| JP | 2017-78906 | 4/2017 |
| WO | 2007/077829 | 7/2007 |

* cited by examiner

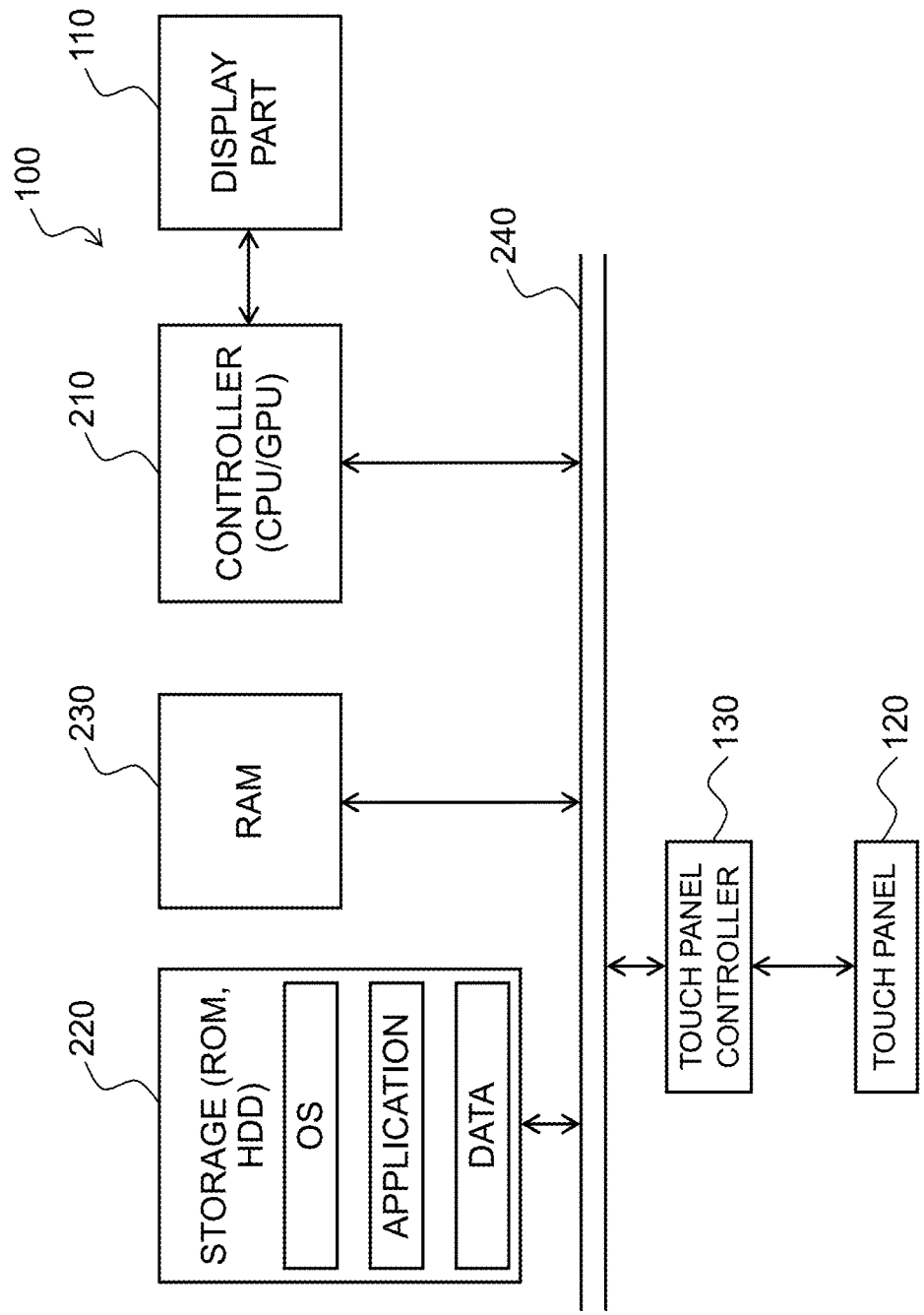

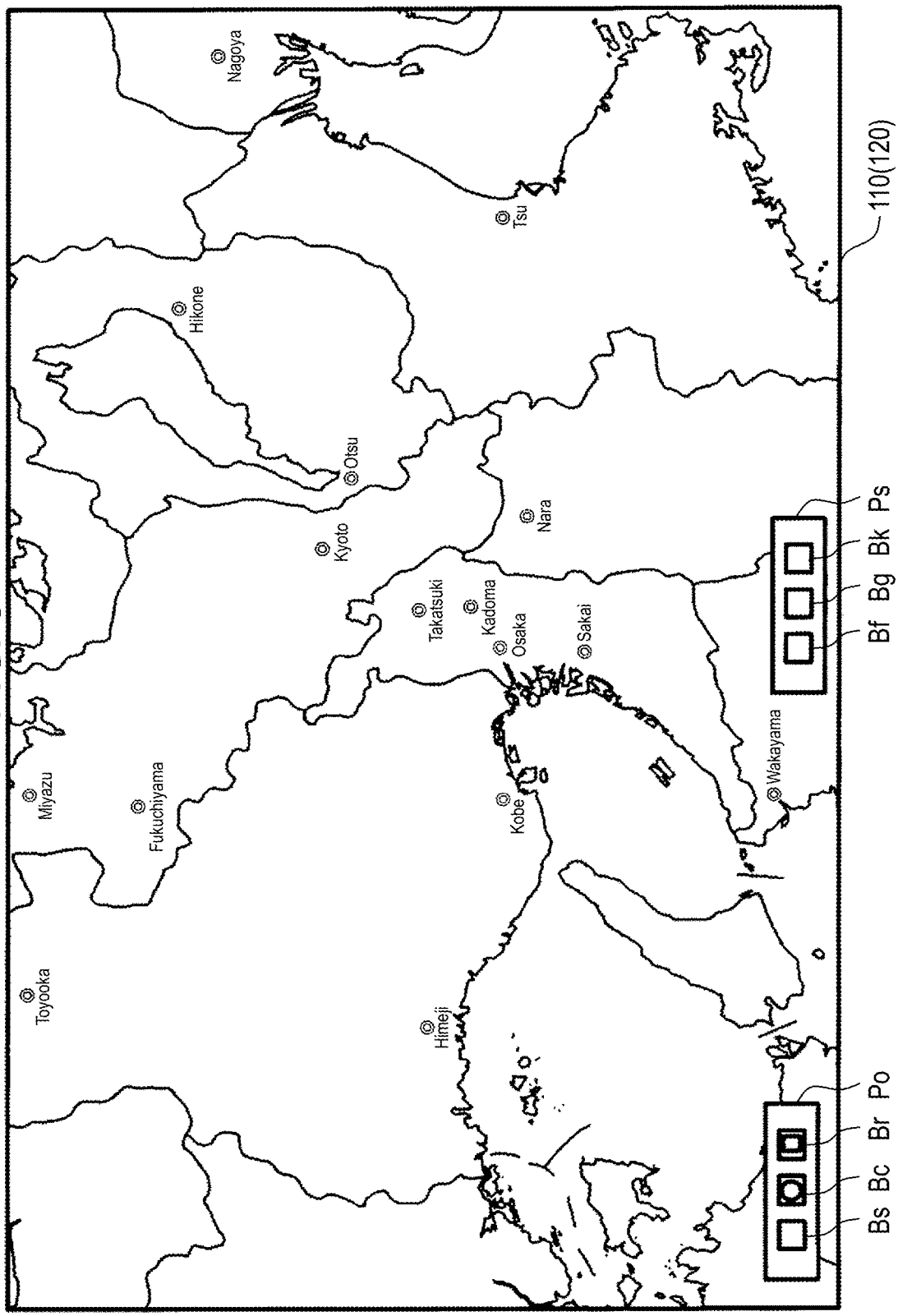

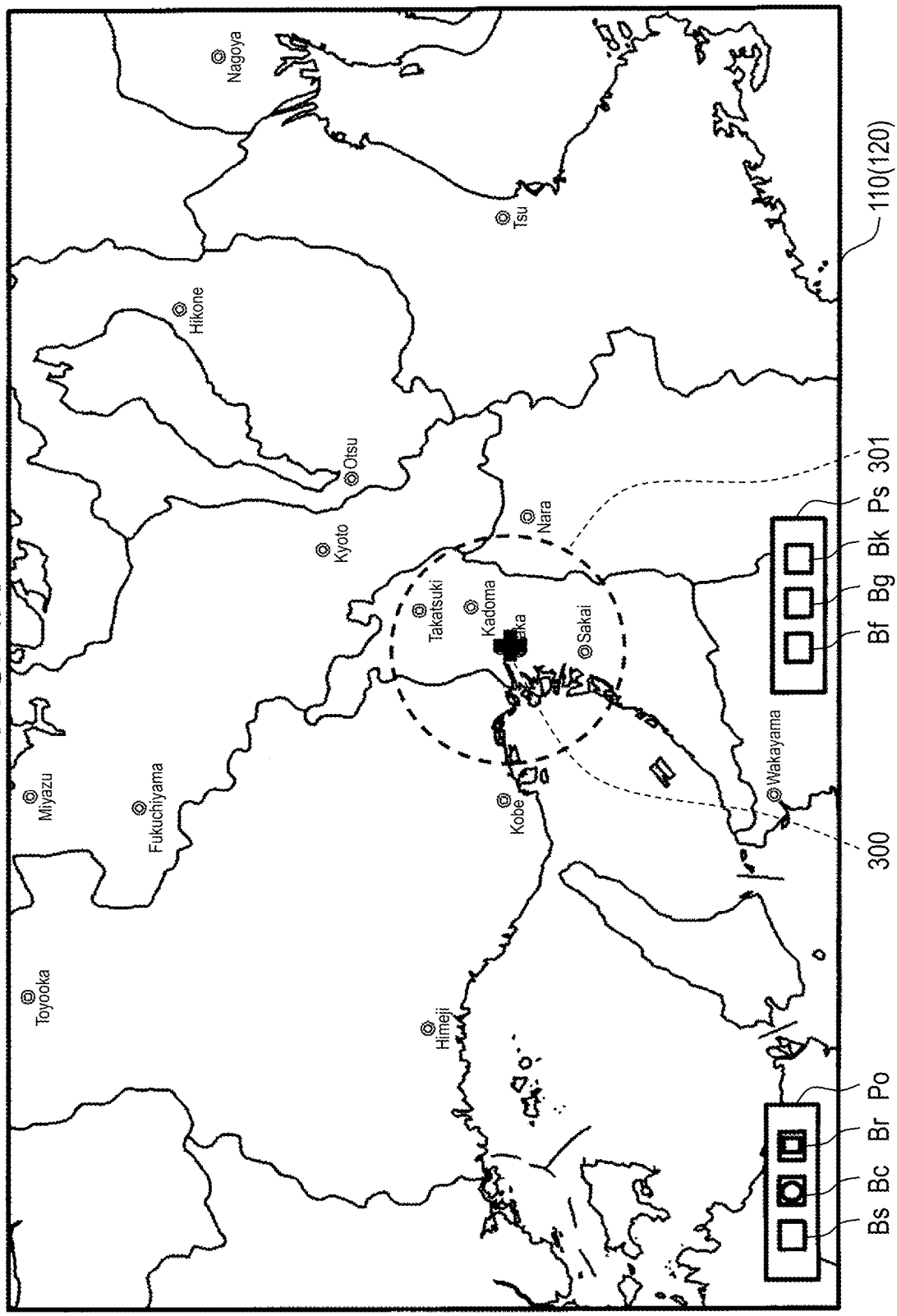

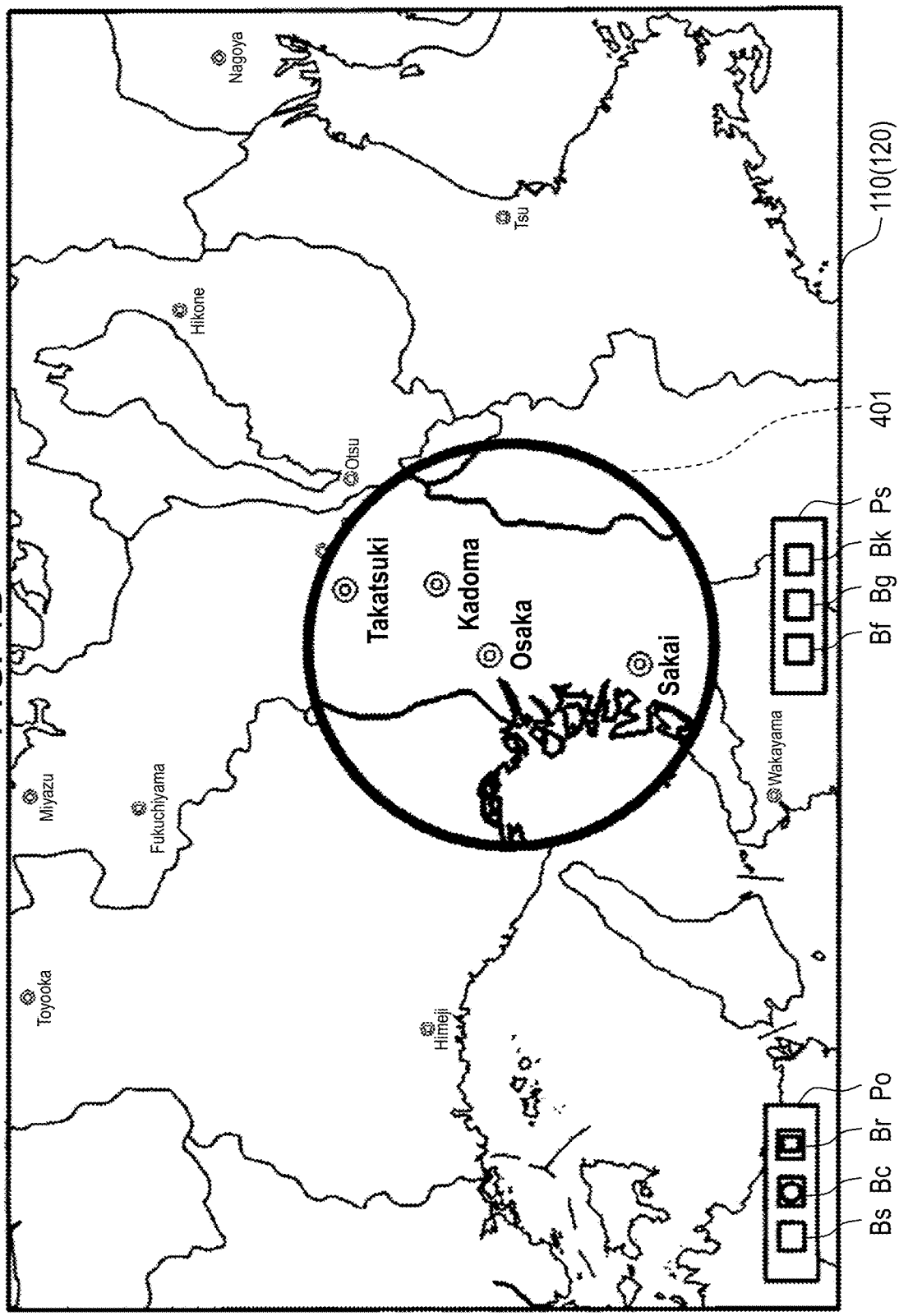

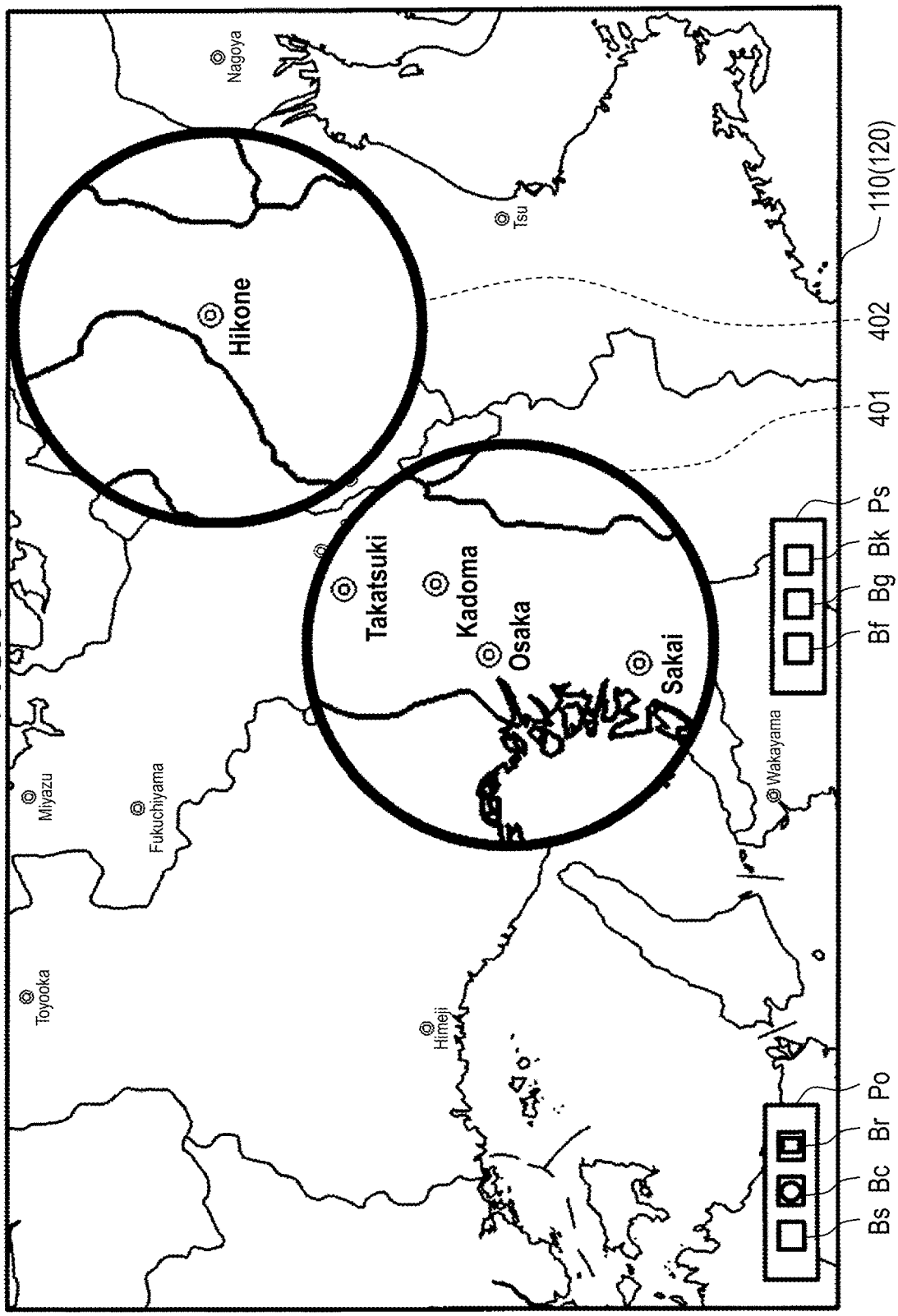

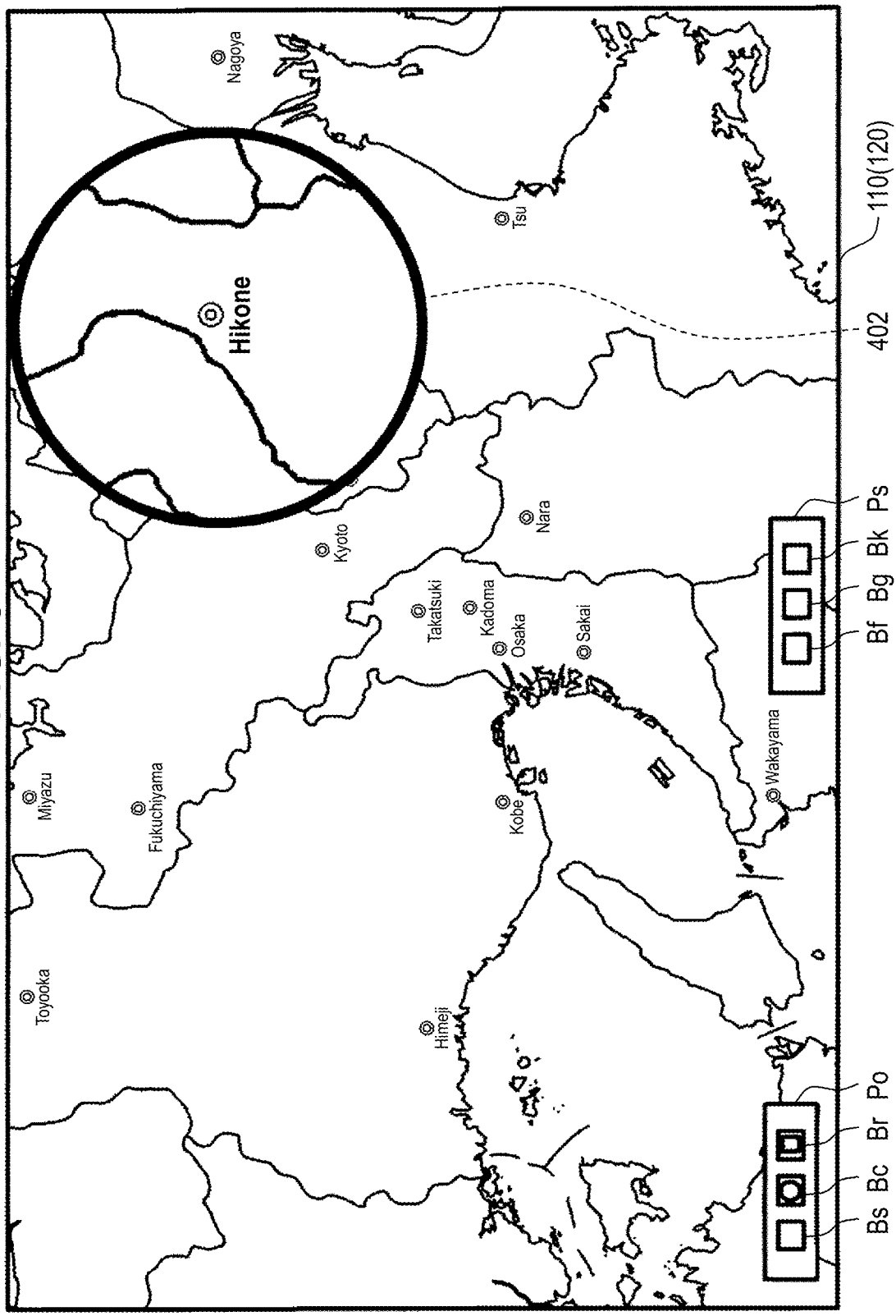

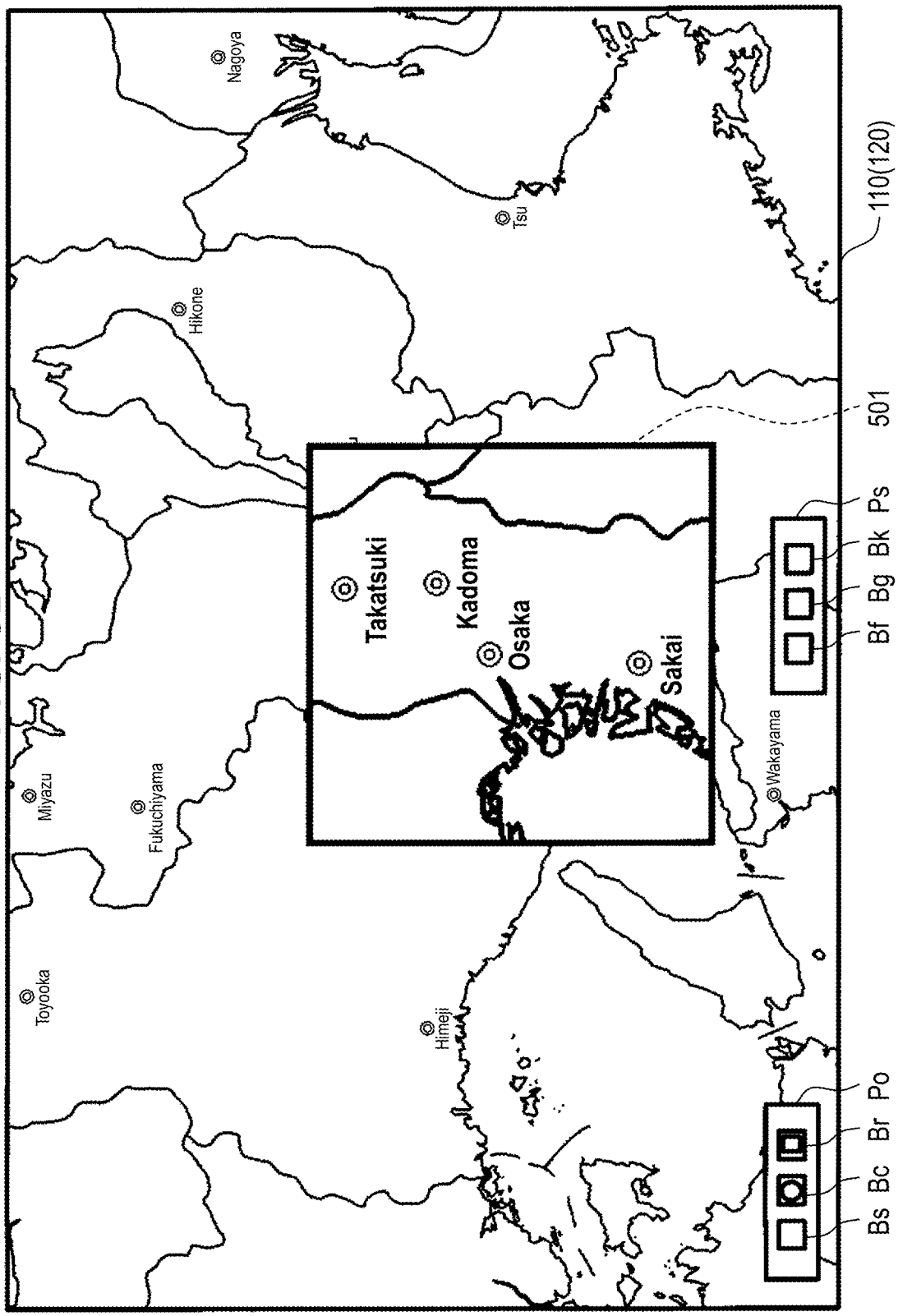

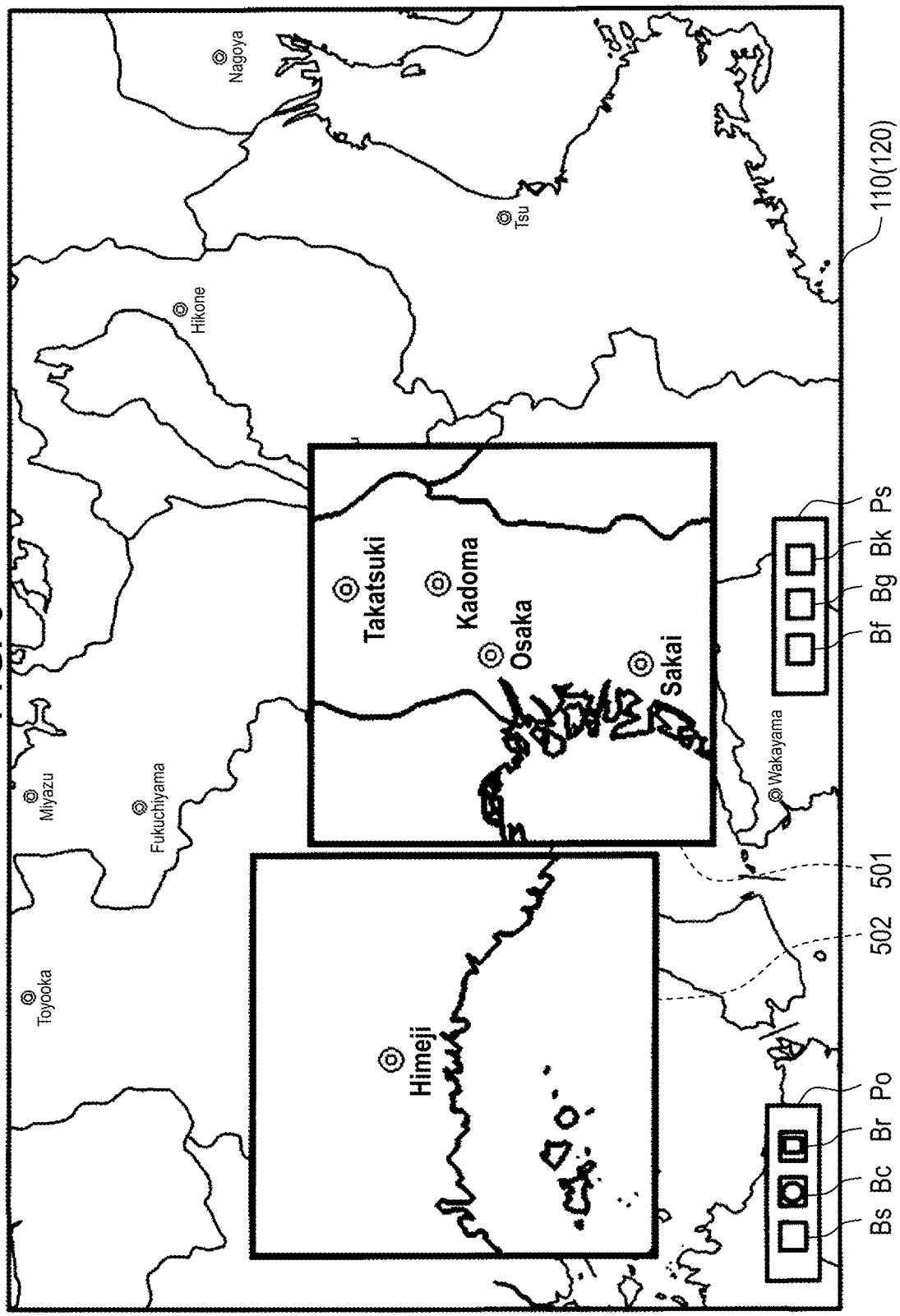

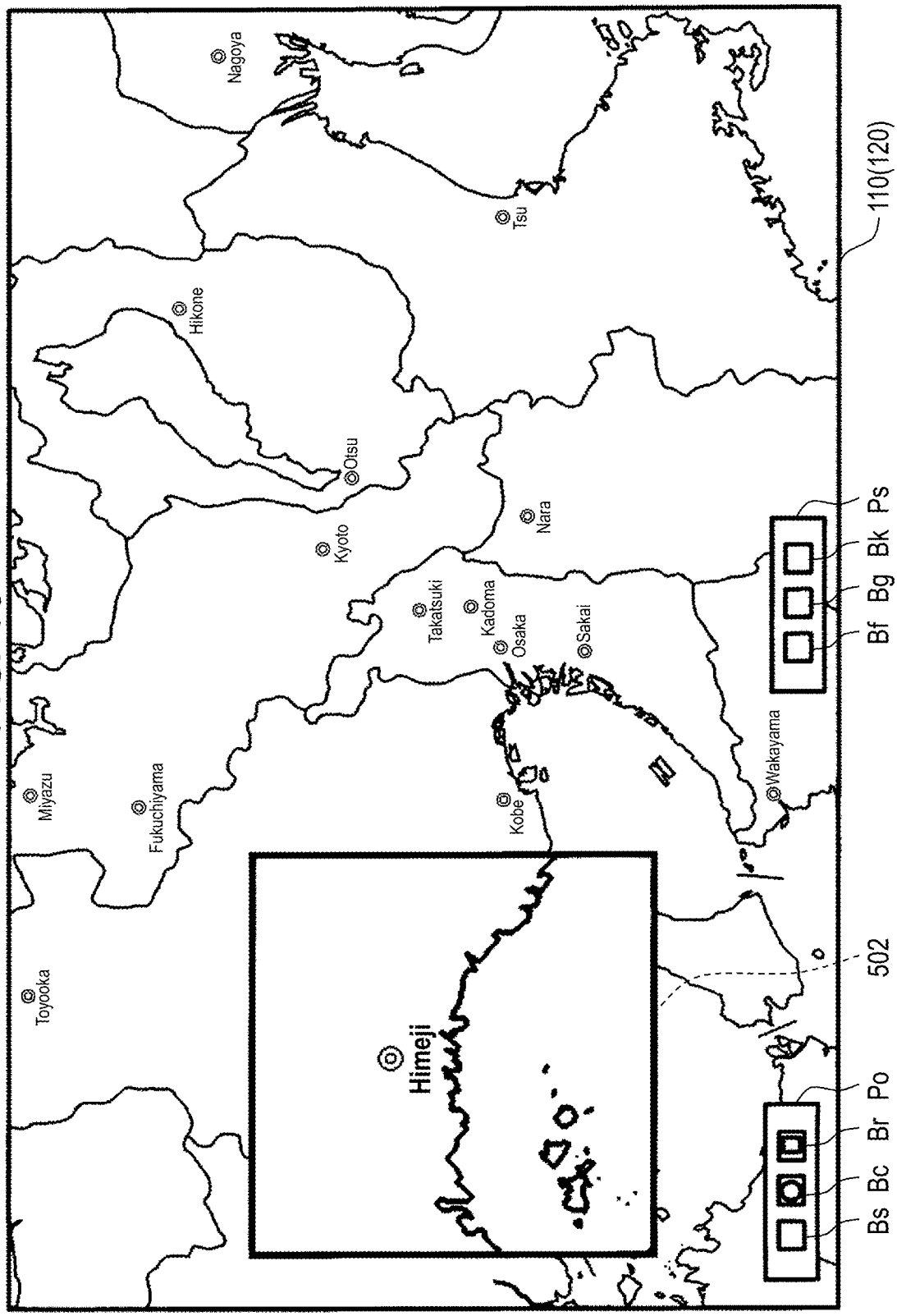

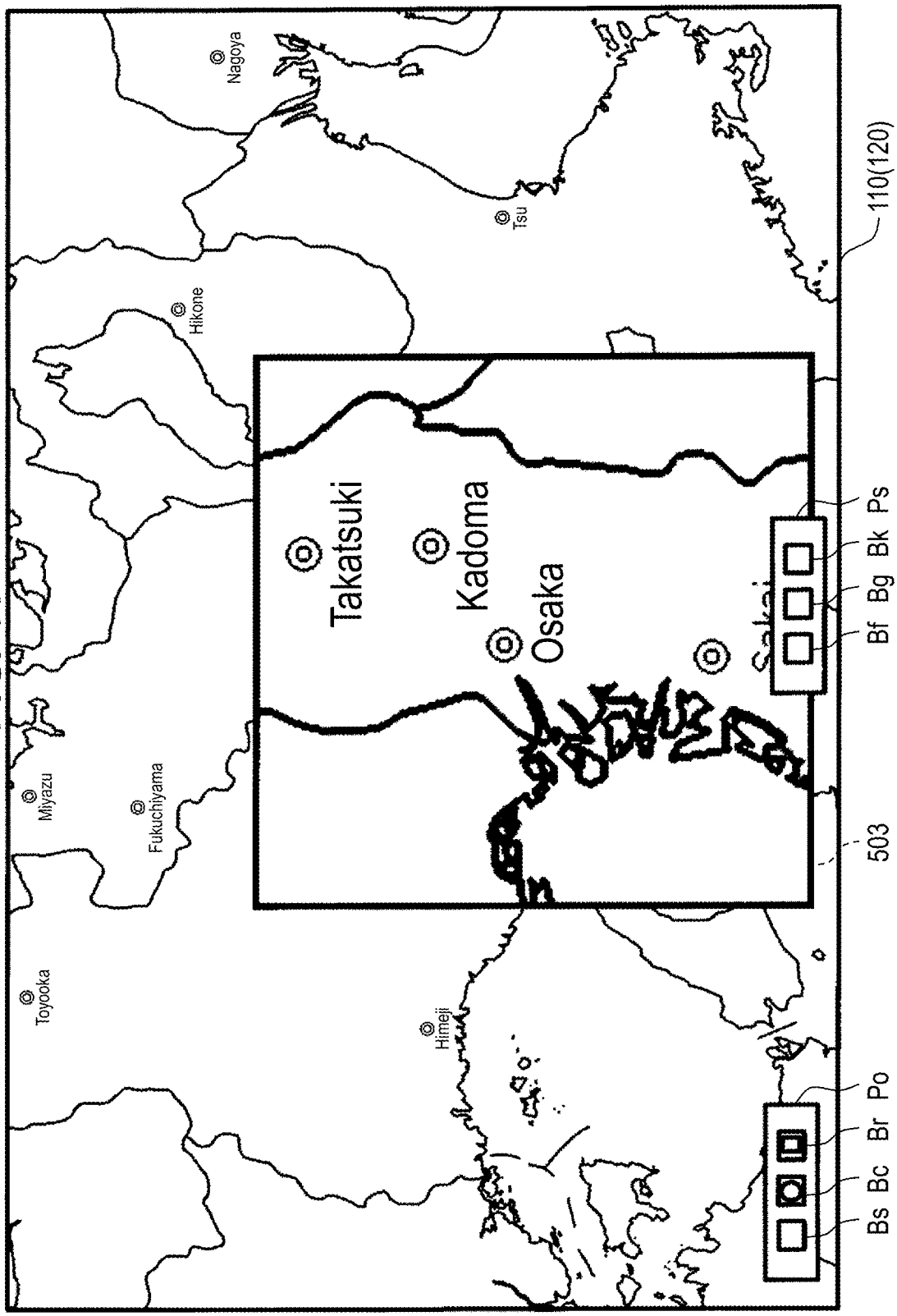

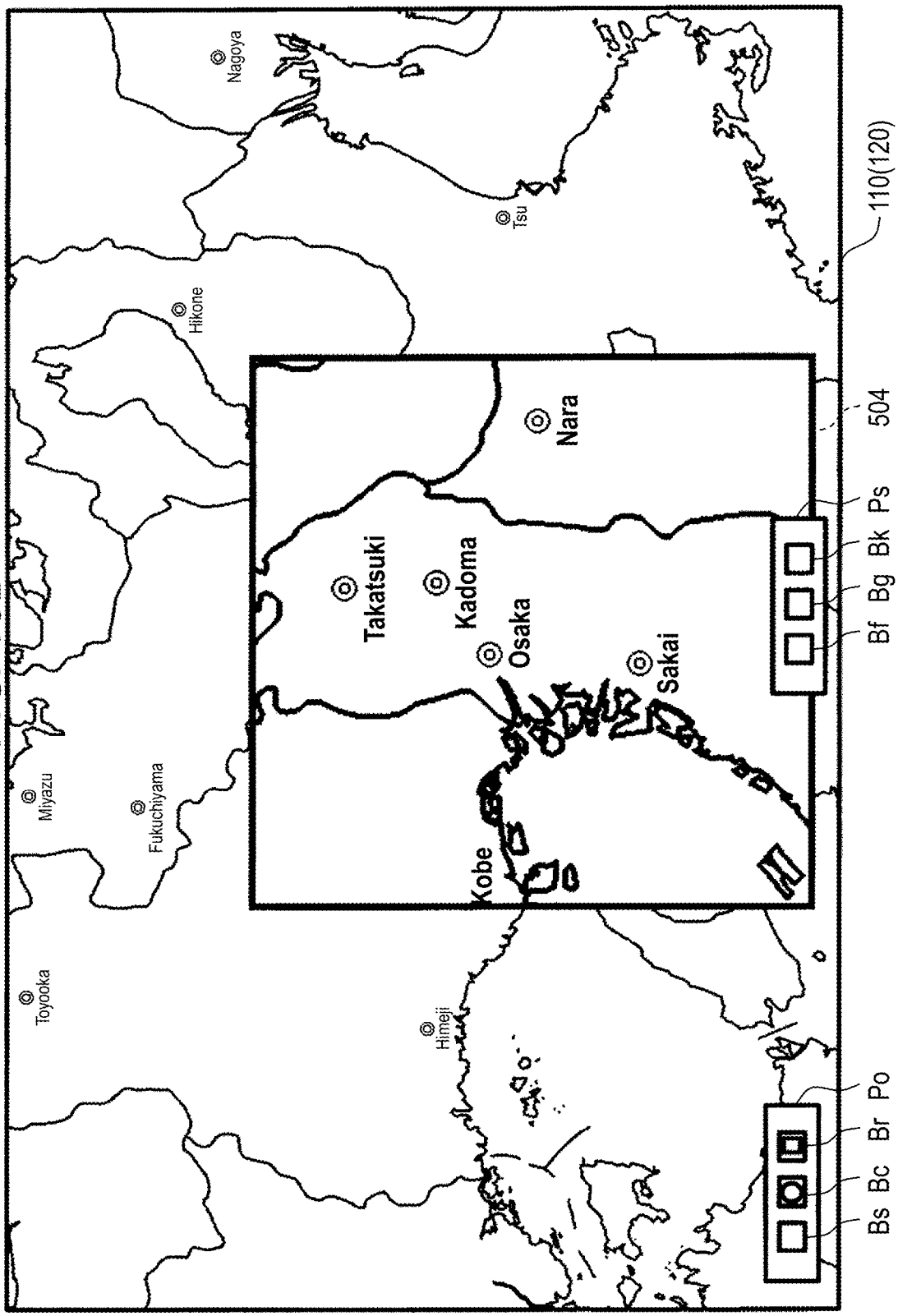

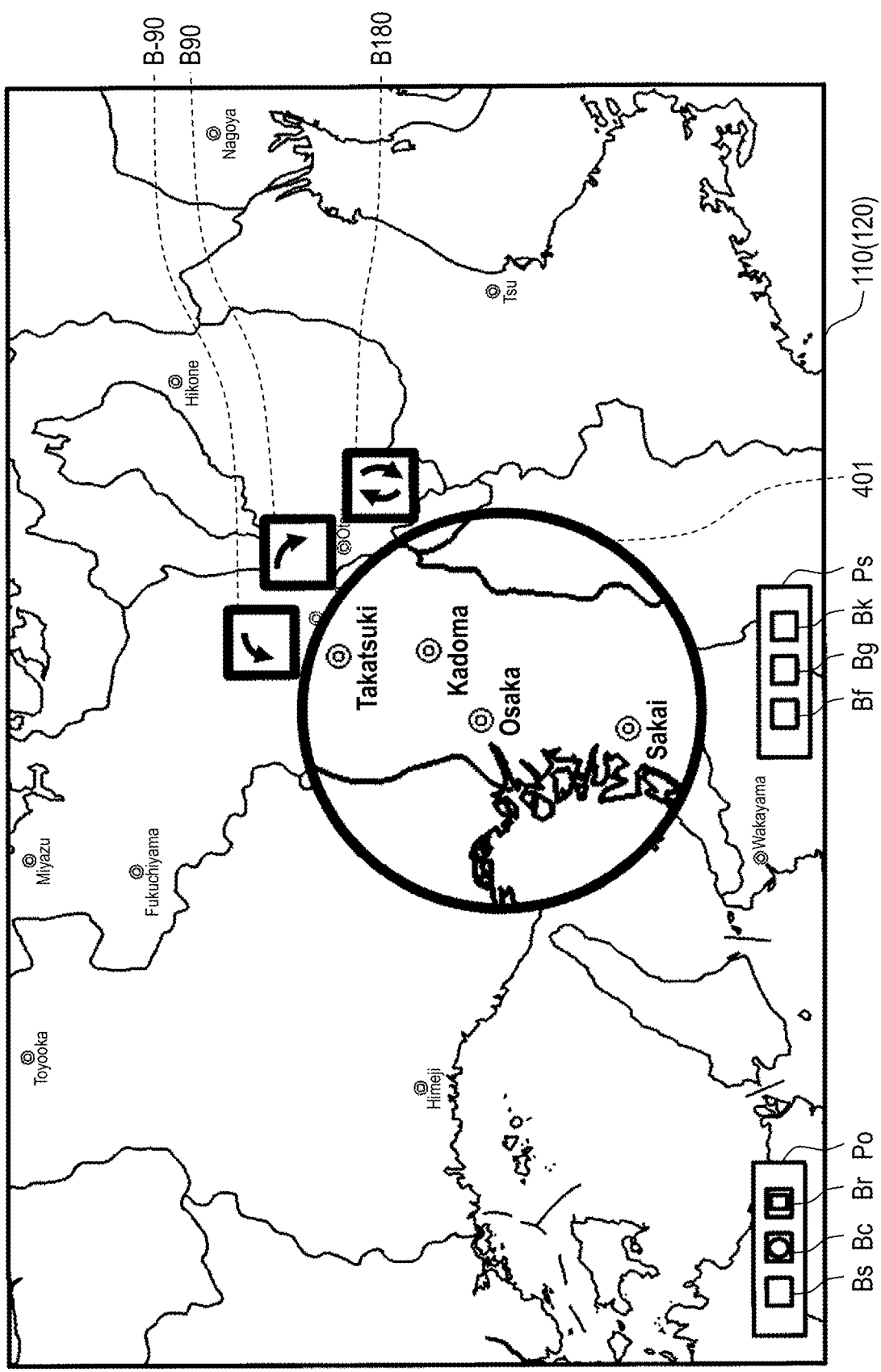

DISPLAY DEVICE

BACKGROUND

1. Technical Field

The present disclosure relates to a display device that enlarges a partial area of an image displayed on a screen and superimposes the partial area on the image for display.

2. Description of the Related Art

Patent Literature (PTL) 1 discloses a display device that enlarges and composites a partial area of an image displayed on a screen for display.

Here, PTL 1 is Unexamined Japanese Patent Publication No. 2013-225261.

SUMMARY

The present disclosure provides a display device capable of preventing image quality from degrading if a partial area of a display image is enlarged and composited for display.

A display device according to a first aspect of the present disclosure includes a display part, a storage that stores original image data of an original image, a detector that detects a touch operation being performed on a screen of the display part, and outputs touch position information indicating a touch position corresponding to the touch operation, and a controller that generates a base image by resizing the original image according to a display resolution of the display part and displays the base image on the display part. When the touch operation is detected by the detector, the controller: determines an enlargement target area that is a part of area on the base image including a position corresponding to the touch position, resizes and cuts an area on the original image to generate a partial enlarged image in which the enlargement target area is enlarged, the area corresponding to the enlarged target area, and display on the display part, the base image and the partial enlarged image which is displayed over a part of the base image.

A display device according to a second aspect of the present disclosure includes a display part, a storage that stores original image data of an original image, a detector that outputs, when a touch operation is performed on a screen of the display part, touch position information indicating a touch position corresponding to the touch operation, and a controller that generates a base image by resizing the original image according to a display resolution of the display part and displays the base image on the display part. When the touch position information is output from the detector, the controller determines an enlargement target object that is included in an enlargement target area that is an area on the base image and includes a position corresponding to the touch position, resizes and cuts a part that is an area on the original image and corresponds to the enlargement target object to generate a partial enlarged image in which the enlargement target object is enlarged, and, composites the partial enlarged image generated with the base image to generate a composite image, and displays the composite image on the display part.

In the present disclosure, the partial enlarged image is generated by resizing and cutting the area on the original image corresponding to the enlargement target area. Therefore, it is possible to prevent image quality from degrading if a partial area of an image is enlarged and composited for display.

BRIEF DESCRIPTION OF DRAWINGS

FIG. 2 is a block diagram illustrating an electric configuration of the display device.

FIG. 3 illustrates an example of a display screen of the display device.

FIG. 4A illustrates another example of the display screen of the display device.

FIG. 4B illustrates still another example of the display screen of the display device.

FIG. 5 illustrates still another example of the display screen of the display device.

FIG. 6 illustrates still another example of the display screen of the display device.

FIG. 8B illustrates still another example of the display screen of the display device.

FIG. 9 illustrates still another example of the display screen of the display device.

FIG. 10 illustrates still another example of the display screen of the display device.

FIG. 11 illustrates still another example of the display screen of the display device.

FIG. 16B illustrates another example of the display screen of the display device according to the second exemplary embodiment.

FIG. 20 illustrates an example of a display screen of a display device according to a seventh exemplary embodiment.

DETAILED DESCRIPTION

Exemplary embodiments will be described in detail below with reference to the drawings as appropriate. However, a detailed description more than necessary may be omitted. For example, a detailed description of a well-known matter and a duplicated description of substantially the same configuration will be omitted in some cases. This is to avoid unnecessary redundancy in the following description and to facilitate understanding by those skilled in the art.

It is noted that the accompanying drawings and the description below are provided to enable those skilled in the art to fully understand the present disclosure, and are not intended to limit the claimed subject matter.

First Exemplary Embodiment

A first exemplary embodiment will be described below with reference to the drawings.

[1-1. Configuration]

Figure 1:
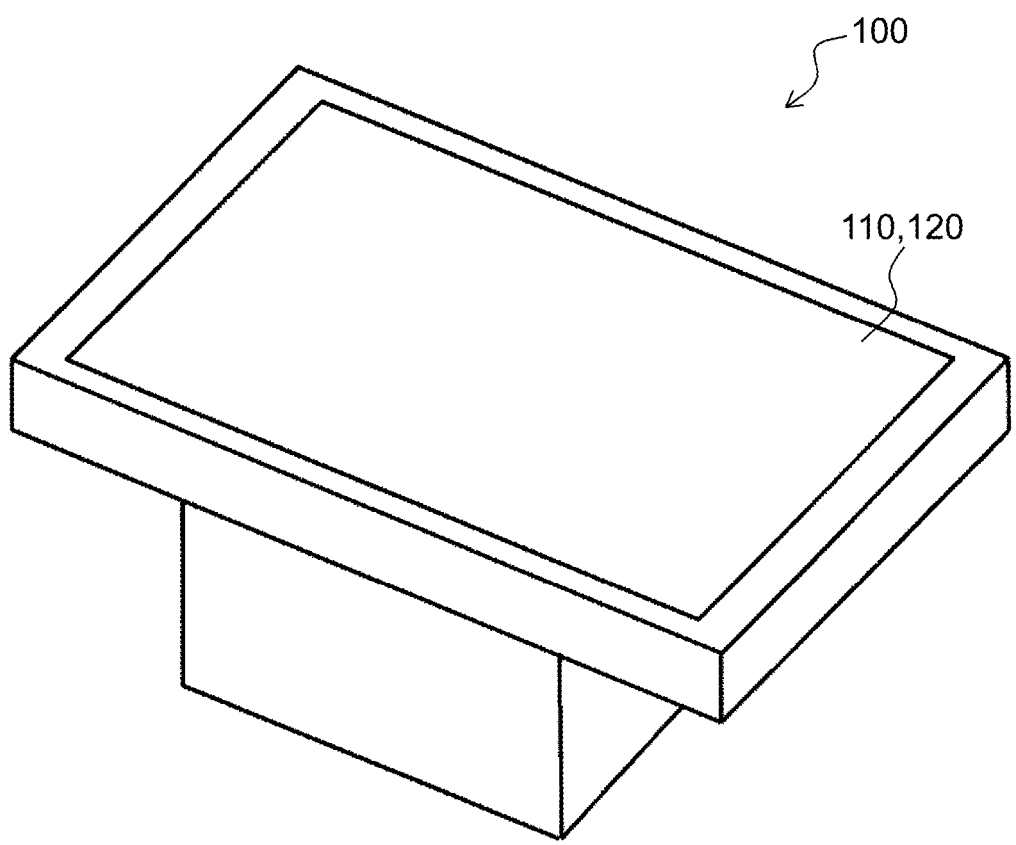
FIG. 1 is a perspective view of an outer appearance of a display device according to a first exemplary embodiment.

FIG. 1 is a perspective view of an outer appearance of a display device according to the first exemplary embodiment. Display device 100 according to the first exemplary embodiment is configured as a device shaped as a stationary table. Display part 110 is disposed flat on a top surface of a top board of display device 100 so as to face vertically upward. Touch panel 120 is disposed on a top surface of display part 110 in an overlapped manner. Display device 100 has such a size that a plurality of people surround display device 100 for use. For example, the top surface of display device 100 has a widthwise side of approximately 150 cm and a depthwise side of approximately 100 cm. In addition, display surface 110 has a widthwise side of approximately 120 cm and a depthwise side of approximately 70 cm. Display device 100 illustrated in FIG. 1 that is configured as a stationary table is an example of the display device according to the present disclosure, as will be described later in other exemplary embodiments.

FIG. 2 is a block diagram illustrating an electric configuration of display device 100. Display device 100 includes display part 110, touch panel 120, touch panel controller 130, controller 210, storage 220, random access memory (RAM) 230, and bus 240.

Display part 110 displays an image in response to an image signal input. Display part 110 is configured by a liquid crystal display or an organic electroluminescence (EL) display, for example. Display part 110 is a so-called 8K display that has 7680 pixels in a horizontal direction (widthwise direction) and 4320 pixels in a vertical direction (depthwise direction). When display device 100 is sized as described above, display device 100 can display characters in a range of 1 mm×1 mm with high definition, for example.

Touch panel 120 is disposed to overlap a surface of display part 110. Touch panel 120 is a pointing device that detects a touch position on display part 110. Touch panel 120 may employ any system such as a capacitance detection system and a resistive film system. Touch panel 120 may be integrated with display part 110.

Touch panel controller 130 detects a touch position using an X electrode group and a Y electrode group of touch panel 120. Touch panel controller 130 can detect, on touch panel 120, not only a single touch by a single finger or a touch pen but also a multi-touch by simultaneous touches of a plurality of fingers. In addition, touch panel controller 130 detects successive changes in touch positions of the fingers at a time of the multi-touch, thus capable of detecting a pinch operation in which two fingers move apart from each other and a rotating operation in which one finger rotates about another finger functioning as support (center), for example.

When the single touch operation is performed, touch panel controller 130 outputs touch position information. Information indicating that the single touch operation has been performed and an X coordinate and a Y coordinate indicating a touch position on touch panel 120 are output as the touch position information. When the pinch operation is performed, touch panel controller 130 outputs pinch operation information. Information indicating that the pinch operation has been performed, an X coordinate and a Y coordinate indicating a position on touch panel 120 that is a base point of the pinch operation, and an operation amount of the pinch operation (separation amount of two fingers) are output as the pinch operation information. Moreover, when the rotating operation is performed, touch panel controller 130 outputs rotating operation information. Information indicating that the rotating operation has been performed, an X coordinate and a Y coordinate indicating a position on touch panel 120 that is a support (base point) of the rotating operation, a rotating direction, and a rotating amount (rotating angle) of the rotating operation are output as the rotating operation information.

Storage 220 stores an operating system (OS), an application program, and various data. The OS provides a system for handling components included in display device 100 as software to a user. The application program includes a program to provide a loupe function to be described later. The data includes original image data to be described later. Storage 220 is configured by a non-volatile memory (for example, read only memory (ROM)), a hard disk drive (HDD), or a solid-state drive (SSD), for example.

RAM 230 temporarily stores data necessary for display device 100 to perform information processing.

Controller 210 controls an operation of display device 100. Controller 210 is configured to include a central processing unit (CPU) and a graphical processing unit (GPU). The CPU mainly controls the operation of display device 100 systematically. For example, the CPU reads the OS and the application program from storage 220 and performs arithmetic processing based on the read OS and the read application program, thus achieving various functions of display device 100. When receiving various information (signals) described above from touch panel controller 130, the CPU performs predetermined processing based on the OS and the application program. The GPU mainly performs predetermined image processing with a heavy processing load in response to a command from the CPU and at the same time, generates a video signal and outputs the video signal to display part 110. As the GPU including a large number of cores performs parallel processing, a processing load on the CPU when performing video processing on an 8K video, that is, a video including an extremely large number of pixels is reduced. Examples of the predetermined image processing with a heavy processing load include composite processing of a partial enlarged image with a base image and resize processing, which will be described later.

Bus 240 is a signal path for transmitting and receiving various signals between one component constituting display device 100 and the other component. In the present exemplary embodiment, touch panel controller 130, controller 210, storage 220, and RAM 230 are connected to bus 240.

1-2. Operation

An operation of display device 100 according to the first exemplary embodiment will be described with reference to FIGS. 3 to 12.

Figure 12:
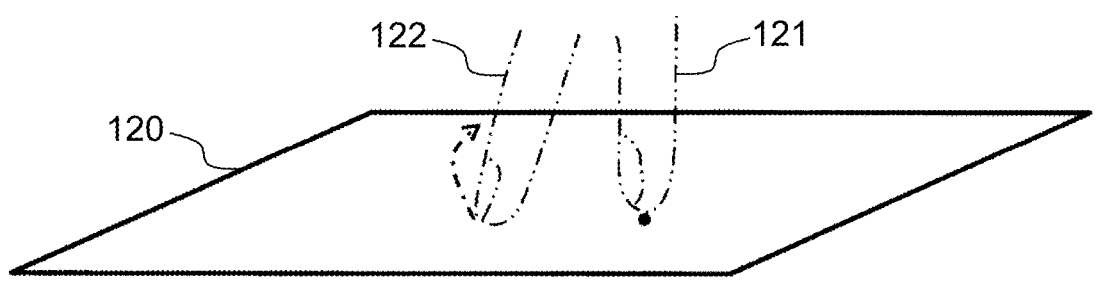
FIG. 12 is an explanatory view of a rotating operation.

FIGS. 3 to 11 illustrate examples of a display screen of display device 100. FIG. 12 is an explanatory view of a rotating operation. When an application program of the present exemplary embodiment is running, a base image is displayed on display part 110. FIG. 3 illustrates an example in which a map data file is selected as a base image file and a map is displayed as a base image. The base image is generated by resizing (downconverting) original image data with a resolution of 20K (number of pixels in horizontal direction is 19200 and number of pixels in vertical direction is 10800) so as to be displayed on display part 110 with a resolution of 8K in an appropriate size. Resizing is performed by controller 210 when the original image data is read and displayed on display part 110.

Loupe operation panel Po is displayed at a lower left corner of the base image displayed on display part 110 so as to be superimposed on the base image. Basic settings panel Ps is displayed near a center of a lower side portion of the base image so as to be superimposed on the base image.

File selection button Bf, enlarge button Bg, and rotate button Bk are arranged on basic settings panel Ps.

File selection button Bf is a button for selecting a file of an image to be displayed on display part 110. When file selection button Bf is touched, controller 210 displays a file list and enables an operation of selecting a desired file.

Enlarge button Bg is a button for increasing a display magnification of a base image displayed. When enlarge button Bg is touched, controller 210 displays an enlarge operation panel and enables an enlarge operation with the display magnification. A default display magnification is set to X1 where 8K that is the resolution of display part 110 matches 8K that is the resolution of a base image.

Rotate button Bk is a button for rotating a base image displayed. When rotate button Bk is touched, controller 210 displays a rotating operation panel and enables an operation of rotating the base image.

Loupe settings button Bs, round loupe button Bc, and square loupe button Br are arranged on loupe operation panel Po.

Loupe settings button Bs is a button for setting a content of a loupe function. When loupe settings button Bs is touched, controller 210 displays a loupe settings panel and enables the content of the loupe function to be set. The loupe settings panel includes setting items such as a loupe magnification of a round loupe, a loupe magnification of a square loupe, and an arrangement position of loupe operation panel Po. The loupe magnification of the round loupe is a magnification of a partial enlarged image displayed in the round loupe with respect to a base image. The loupe magnification of the square loupe is a magnification of a partial enlarged image displayed in the square loupe with respect to a base image. The loupe magnification of the round loupe and the loupe magnification of the square loupe are set by default to X2 based on a length. In a description of specific examples of a round loupe function and a square loupe function that will be described later, it is assumed that the loupe magnification of the round loupe and the loupe magnification of the square loupe are set to a default (that is, X2 based on length). By operating the arrangement position of loupe operation panel Po, a position of loupe operation panel Po can be changed to any position such as any of four corners of the display screen. FIG. 3 illustrates an example in which the arrangement position of loupe operation panel Po is set to the lower left corner of the display screen.

Round loupe button Bc is a button for validating or invalidating the round loupe function to be described later. When round loupe button Bc is touched in a state where the round loupe function is not validated, controller 210 validates the round loupe function. When round loupe button Bc is touched in a state where the round loupe function is validated, controller 210 invalidates the round loupe function.

Square loupe button Br is a button for validating or invalidating the square loupe function to be described later. When square loupe button Br is touched in a state where the square loupe function is not validated, controller 210 validates the square loupe function. When square loupe button Br is touched in a state where the square loupe function is validated, controller 210 invalidates the square loupe function.

(Function of Round Loupe)

When a user touches a certain position on a screen (display surface) of display part 110 in a state where the round loupe function is validated, controller 210 determines enlargement target area 301 as illustrated in FIG. 4A. Enlargement target area 301 is an area on a base image and a circle with a predetermined diameter whose center is at a position corresponding to a touch position (hereinafter, referred to as "corresponding touch position"). Controller 210 generates a partial enlarged image from an original image by enlarging enlargement target area 301 based on a loupe magnification and composites partial enlarged image 401 generated with the base image for display, as illustrated in FIG. 4B. FIGS. 4A and 4B illustrate an example in which a proximity of a word "Osaka" is touched and partial enlarged image 401 is generated at a default loupe magnification (X2).

When controller 210 of the present exemplary embodiment uses the round loupe function to generate a partial enlarged image based on a loupe magnification, controller 210 generates the partial enlarged image by performing resize processing not on a base image currently being displayed but on an original image (image of original image data) of the base image currently being displayed. More specifically, controller 210 cuts an image of enlargement target area 301 whose center is at corresponding touch position 300 from the original image of the base image currently being displayed and performs the resize processing on the cut image based on the loupe magnification, thus generating the partial enlarged image that is enlarged from the base image based on the loupe magnification. Processing of generating the partial enlarged image will be described in detail later.

A description will be given of a case where, for example as illustrated in FIG. 4B, a user touches a certain position on the screen of display part 110 other than an area where partial enlarged image 401 is displayed when partial enlarged image 401 is already displayed and the round loupe function is validated. As described with reference to FIGS. 4A and 4B, controller 210 generates partial enlarged image 402 from an original image by enlarging an enlargement target area (not illustrated in FIG. 5) that is a circular area with a predetermined diameter whose center is at a corresponding touch position based on a loupe magnification and displays partial enlarged image 402 so as to be superimposed on the base image, as illustrated in FIG. 5. Two partial enlarged images, that is, partial enlarged image 401 that has been previously displayed and partial enlarged image 402 are thus displayed. FIG. 5 illustrates an example in which a proximity of a word "Hikone" is touched and partial enlarged image 402 is generated at the default loupe magnification (X2).

A description will be given of a case where, for example as illustrated in FIG. 5, a user further touches a certain position on the screen of display part 110 other than areas where partial enlarged images 401, 402 are displayed when two partial enlarged images 401, 402 are already displayed and the round loupe function is validated. As described above, controller 210 generates a partial enlarged image (not illustrated in FIG. 5) from the original image by enlarging enlargement target area 301 that is a circular area with a predetermined diameter whose center is at the corresponding touch position based on the loupe magnification and displays the partial enlarged image so as to be superimposed on a base image. When a number of the partial enlarged images displayed reaches a predetermined number (for example, 10), controller 210 does not need to generate a new partial enlarged image even if the user touches an area on the base image other than the area where the partial enlarged image is displayed. Consequently, it is possible to prevent the number of the partial enlarged images displayed from increasing and thus the base image from being hardly viewed.

When the round loupe function is validated, controller 210 measures a time elapsed since a partial enlarged image has been displayed (substantially since touch operation has been performed (touch position information has been output)) and erases a partial enlarged image whose elapsed time exceeds a predetermined time. With such a setting, when a plurality of partial enlarged images are displayed, the partial enlarged image whose elapsed time exceeds the predetermined time is sequentially erased. The predetermined time is a time that is long enough for a user to visually recognize a content of a partial enlarged image appropriately, for example, 10 seconds. As the partial enlarged images are sequentially erased, it is possible to prevent the number of partial enlarged images displayed from increasing too much without requiring a user's operation. For example, when the elapsed time of partial enlarged image 401 on a left side that is generated based on a first touch operation among two partial enlarged images 401, 402 illustrated in FIG. 5 exceeds the predetermined time, controller 210 erases partial enlarged image 401 as illustrated in FIG. 6. When the elapsed time of partial enlarged image 402 on a right side exceeds the predetermined time, partial enlarged image 402 is also erased. When the number of partial enlarged images displayed exceeds the predetermined number, a partial enlarged image may be erased based on the elapsed time.

Figure 7:
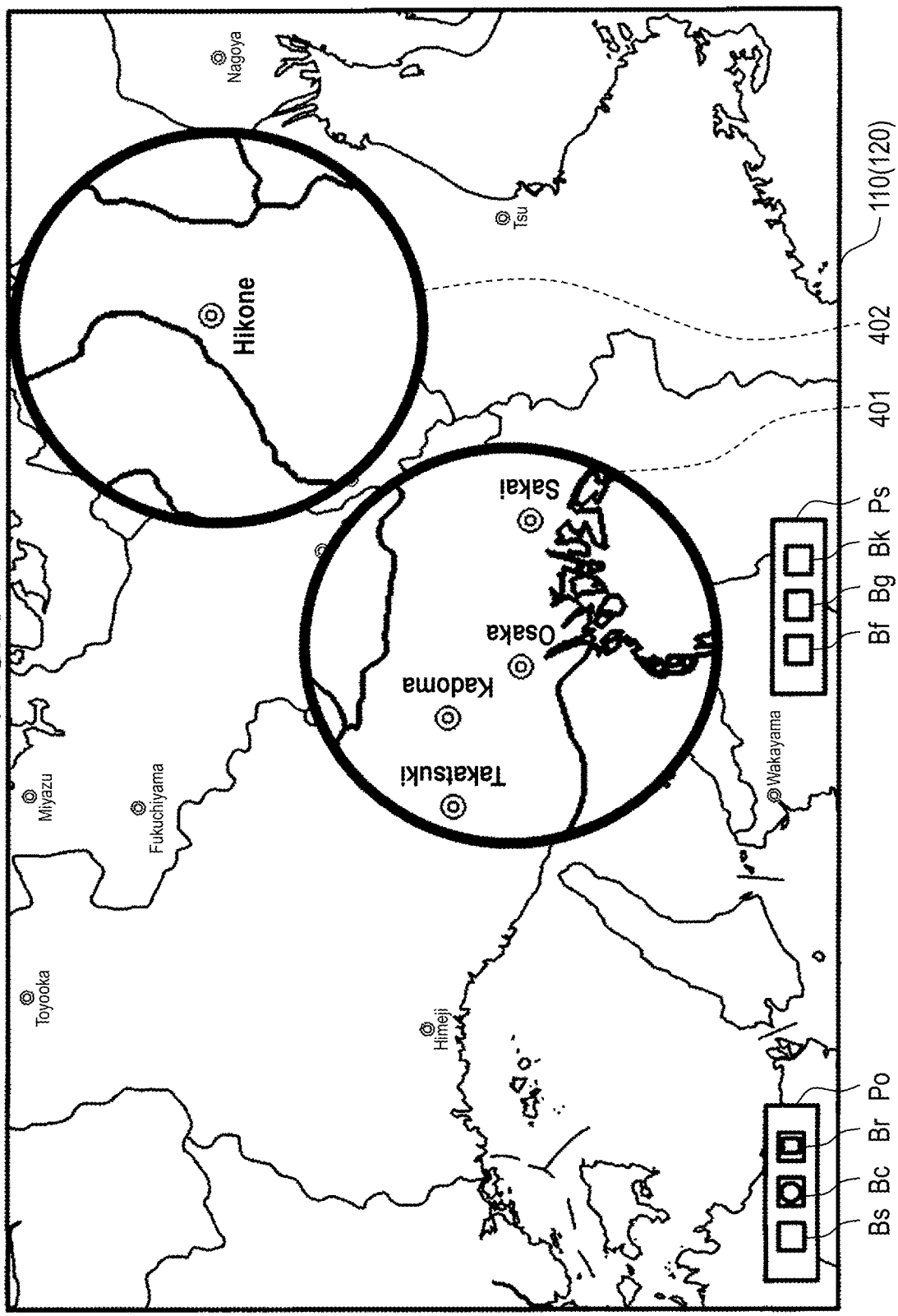
FIG. 7 illustrates still another example of the display screen of the display device.

When a user performs a rotating operation to be described later in a display area of partial enlarged image 401 on the left side in a state where the round loupe function is validated and two partial enlarged image 401, 402 are already displayed as illustrated in FIG. 5, for example, controller 210 rotates only partial enlarged image 401 subjected to the rotating operation by a predetermined angle according to a rotating direction and a rotating amount of the rotating operation, as illustrated in FIG. 7. FIG. 7 illustrates an example of rotating partial enlarged image 401 counterclockwise 90 degrees. The user can thus rotate a partial enlarged image so as to easily and visually recognize the partial enlarged image. For example, the rotating operation is an operation of rotating one finger 122 (for example, middle finger) about another finger 121 functioning as a support (for example, index finger) in a state where two fingers 121, 122 (for example, index finger and middle finger) touch touch panel 120 within the display area of the partial enlarged image, as illustrated in FIG. 12. FIG. 12 illustrates an example of rotating one finger 122 (for example, middle finger) clockwise. While an example of using the index finger and the middle finger is described, a combination of a thumb and the index finger, a combination of the middle finger and a ring finger, and any other combinations may be possible.

(Function of Square Loupe)

Figure 8A:
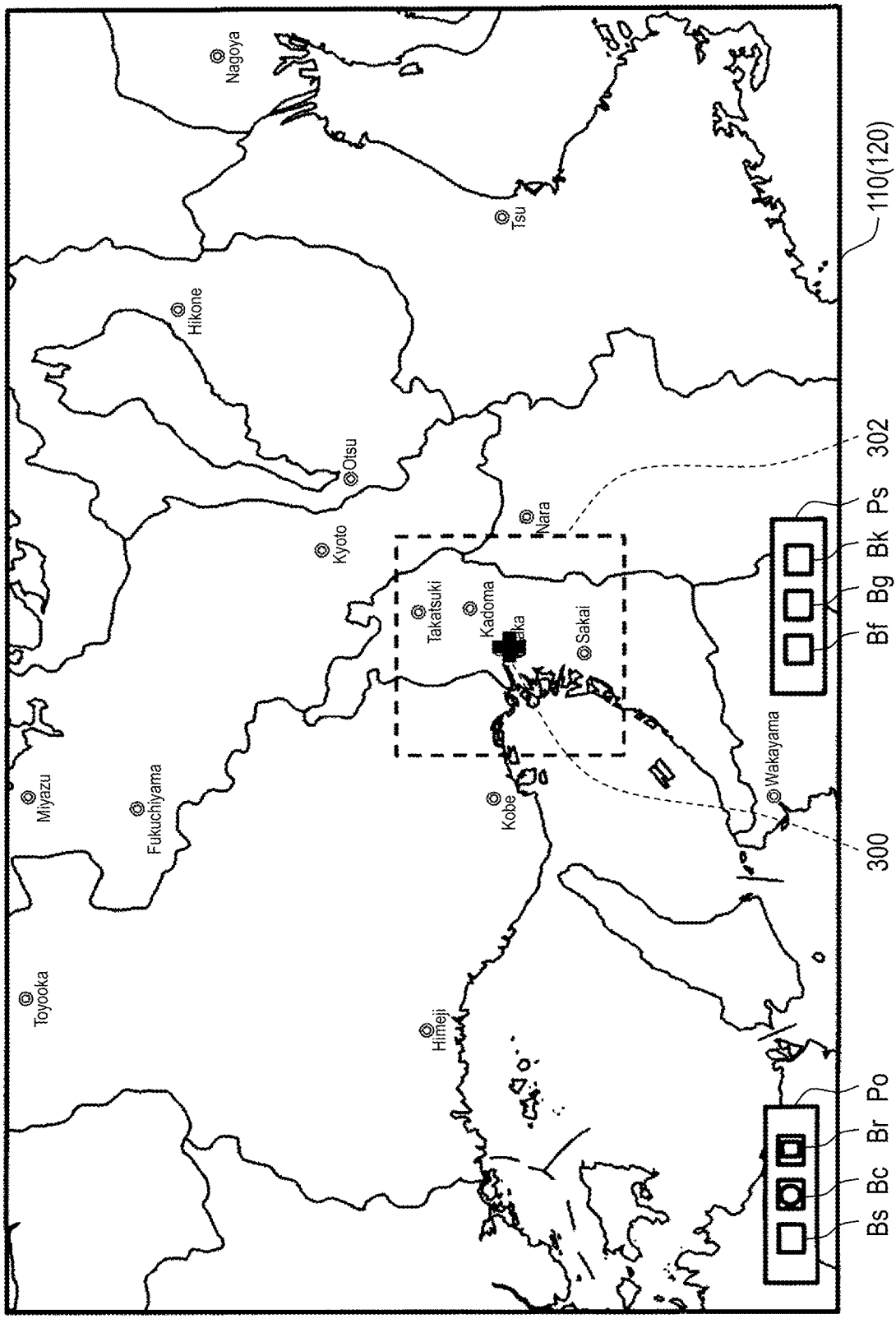
FIG. 8A illustrates still another example of the display screen of the display device.

When a user touches a certain position on a screen of display part 110 in a state where the square loupe function is validated, controller 210 determines enlargement target area 302 as illustrated in FIG. 8A. Enlargement target area 302 is a predetermined square range whose center is at corresponding touch position 300 on a base image. Controller 210 generates a partial enlarged image from original image data by enlarging enlargement target area 302 based on a loupe magnification and composites partial enlarged image 501 generated with the base image for display, as illustrated in FIG. 8B. FIGS. 8A and 8B illustrate an example in which a proximity of the word "Osaka" is touched and partial enlarged image 501 is generated at a default loupe magnification (X2).

When controller 210 of the present exemplary embodiment uses the square loupe function to generate a partial enlarged image based on a loupe magnification, controller 210 generates the partial enlarged image by performing resize processing not on a base image currently being displayed but on an original image (image of original image data) of the base image currently being displayed. More specifically, controller 210 cuts an image of enlargement target area 302 whose center is at corresponding touch position 300 from the original image of the base image currently being displayed and performs the resize processing on the cut image based on the loupe magnification, thus generating the partial enlarged image that is enlarged from the base image based on the loupe magnification. The processing of generating the partial enlarged image will be described in detail later.

A description will be given of a case where, for example as illustrated in FIG. 8B, a user touches a certain position on the screen of display part 110 other than an area where partial enlarged image 501 is displayed when partial enlarged image 501 is already displayed and the square loupe function is validated. As described with reference to FIGS. 8A and 8B, controller 210 generates partial enlarged image 502 from original image data by enlarging an enlargement target area (not illustrated in FIG. 9) that is a predetermined square range whose center is at a corresponding touch position based on a loupe magnification and displays partial enlarged image 502 so as to be superimposed on a base image, as illustrated in FIG. 9. Two partial enlarged images, that is, partial enlarged image 501 that has been previously displayed and partial enlarged image 502 are thus displayed. FIG. 9 illustrates an example in which a proximity of a word "Himeji" is touched and partial enlarged image 502 is generated at the default loupe magnification (X2).

When a user touches a certain position on the screen of display part 110 other than the areas where partial enlarged images 501, 502 are displayed, controller 210 generates a partial enlarged image from the original image data by enlarging enlargement target area 302 that is a predetermined square range whose center is at the corresponding touch position based on the loupe magnification and displays the partial enlarged image so as to be superimposed on a base image, as described above. As in the case of the round loupe function, as a user touches an area on the screen of display part 110 other than the area where the partial enlarged image is displayed, a partial enlarged image is sequentially displayed. The square loupe function is similar to the round loupe function in the following point. That is, when the number of partial enlarged images displayed reaches a predetermined number, as in the case of the round loupe function, controller 210 does not need to generate a new partial enlarged image.

As in the case of the round loupe function described above, when the square loupe function is validated, controller 210 may measure a time elapsed since a partial enlarged image has been displayed and erase a partial enlarged image whose elapsed time exceeds a predetermined time. For example, when the elapsed time of partial enlarged image 501 that is generated based on a first touch operation among two partial enlarged images 501, 502 illustrated in FIG. 9 exceeds the predetermined time, controller 210 erases partial enlarged image 501 as illustrated in FIG. 10. Erasing a partial enlarged image based on an elapsed time when the square loupe function is validated is similar to that in the round loupe function described above, and thus a detailed description will be omitted.

When the square loupe function is validated and in a display state of FIG. 8B for example, if a user performs a pinch-out operation (pinch operation) within a display area of partial enlarged image 501, controller 210 enlarges partial enlarged image 501 at an arbitrary magnification according to a pinch-out operation amount and displays partial enlarged image 503 enlarged so as to be superimposed on a base image, as illustrated in FIG. 11. The pinch-out operation may be a so-called pinch operation of moving, for example, two fingers (for example, thumb and index finger) in a direction apart from each other with the fingers touching touch panel 120 (in a state of a multi-touch). The direction apart from each other may be any direction such as an X direction and a Y direction of touch panel 120 and directions inclined to the X and Y directions.

(Display Control of Controller 210)

Display control of controller 210 when the round loupe function or the square loupe function is validated will be described in an order of the round loupe function and the square loupe function.

Figure 13:
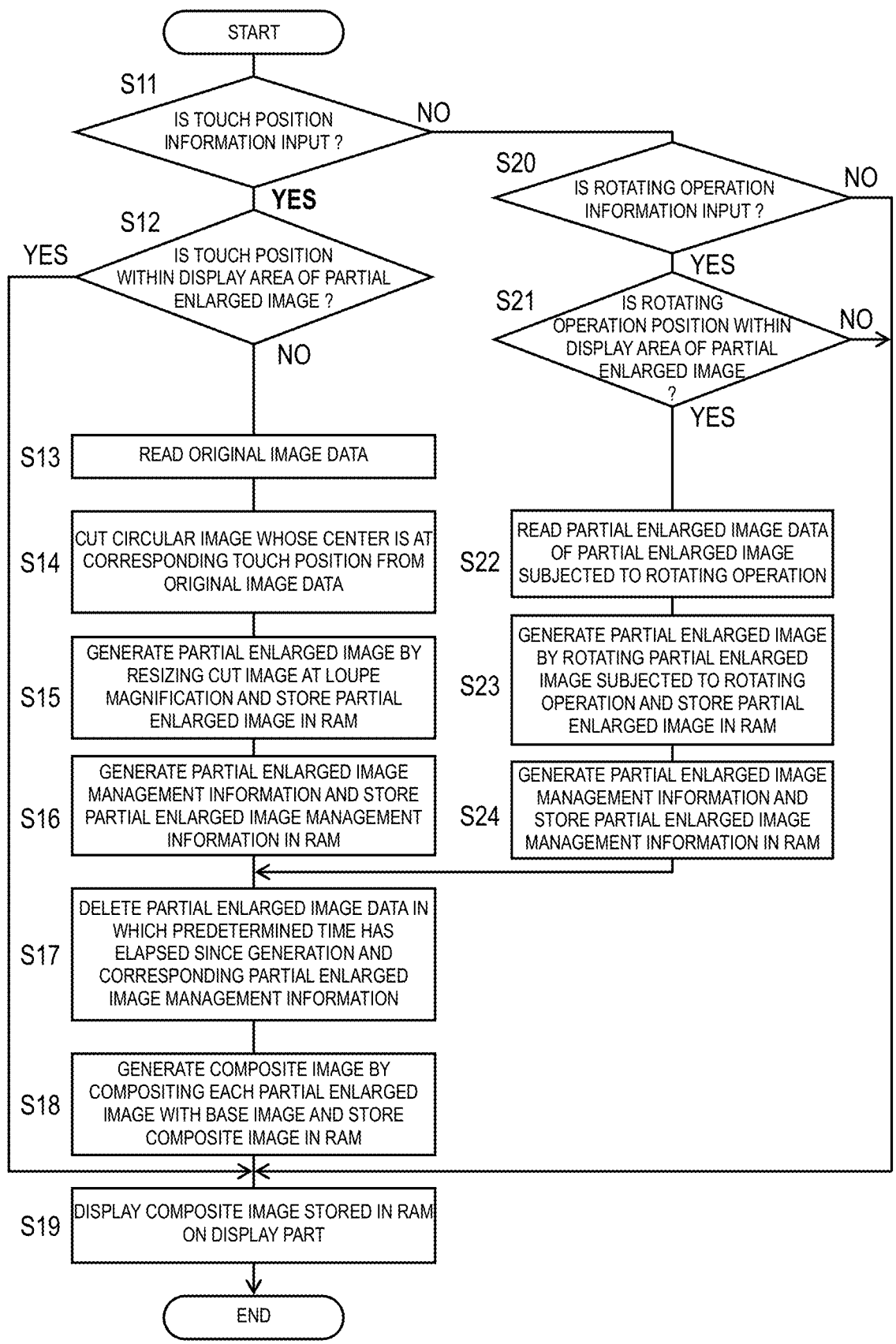
FIG. 13 is a flowchart of an example of an operation performed by the display device when a round loupe function is selected.

FIG. 13 is a flowchart of an example of the display control of controller 210 when the round loupe function is selected. Processing illustrated in the flowchart is performed in a period of a predetermined time. The predetermined time may be set based on a display refresh rate, for example.

Controller 210 determines whether touch position information is input from touch panel controller 130 (S11). That is to say, controller 210 determines whether a user performs a touch operation on touch panel 120.

When it is determined that the touch operation is performed (YES at S11), controller 210 determines whether a touch position indicated by the touch position information is within a display area of a partial enlarged image (S12). That is to say, it is determined whether the touch operation is a touch operation on a base image or a touch operation on the partial enlarged image.

When the touch position is not within the display area of the partial enlarged image (NO at S12), controller 210 reads original image data of the base image from storage 220 (S13).

Controller 210 calculates a position on an original image of the base image being displayed corresponding to the touch position of touch panel 120 (hereinafter, referred to as "corresponding touch position") and cuts a circular image with a predetermined diameter whose center is at the corresponding touch position from the original image data (S14).

Controller 210 generates a partial enlarged image by resizing (enlarging) a cut image based on a loupe magnification and stores data of the partial enlarged image generated (hereinafter, referred to as "partial enlarged image data") in RAM 230 (S15).

A method of calculating a corresponding touch position on an original image and generating a composite partial enlarged image will be described.

Figure 14:
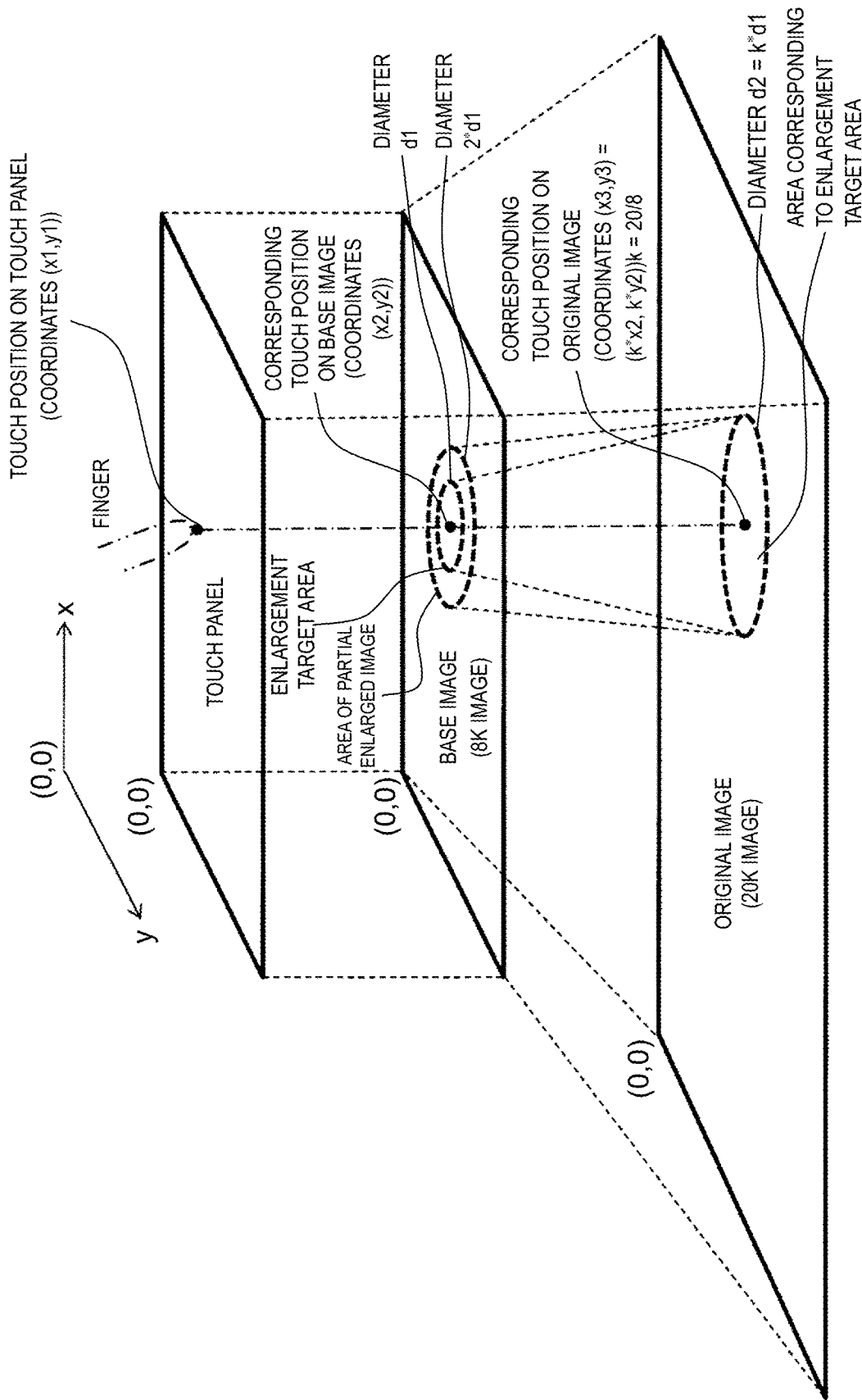
FIG. 14 is an explanatory view of a method of calculating a corresponding touch position on an original image and generating a composite partial enlarged image.

FIG. 14 is an explanatory view of a method of calculating a corresponding touch position on an original image and generating a composite partial enlarged image. FIG. 14 illustrates an example in which the original image is an image with a resolution of 20K, a base image is an image with a resolution of 8K, and a circular area (hereinafter, referred to as "enlargement target area" as appropriate) functioning as an enlargement source on the base image is enlarged to an area having a double diameter.

It is assumed that a user performs a touch operation on a touch panel and a touch position at that time is at coordinates (x1, y1). In this case, coordinates of the corresponding touch position on the base image are (x2, y2). The corresponding touch position can be calculated by well-known position coordinate conversion. It is assumed that an enlargement target area with diameter d1 whose center is at the corresponding touch position (coordinates (x2, y2)) is enlarged to an area having a double diameter (2*d1). In this case, coordinates (x3, y3) of the corresponding touch position on the original image can be calculated as coordinates (k*x2, k*y2) using size ratio k of a size of the original image to a size of the base image. In the example of FIG. 14, size ratio k is 20/8, that is, 2.5. In addition, diameter d2 of the original image corresponding to diameter d1 of the base image can be calculated by an equation (d2=k*d1) using size ratio k described above. A circular area with diameter d2 whose center is at coordinates (k*x2, k*y2) calculated as described above is cut from the original image. After cutting, a cut image is resized 2/k times based on size ratio k described above so as to have diameter (2*d1) that is twice larger than diameter d1 of the enlargement target area on the base image, so that a composite partial enlarged image is formed. The composite partial enlarged image formed as described above is superimposed on and composited with the base image at the corresponding touch position (coordinates (x2, y2).

A resize magnification is 2/k as described above. In the example of FIG. 14, size ratio k is 20/8 and thus the resize magnification is X0.8. The partial enlarged image can thus be obtained by resizing, that is to say, reducing the cut image. Consequently, a sense of resolution hardly degrades in the partial enlarged image obtained. On the other hand, when the enlargement target area is cut from the base image and then the diameter of the enlargement target area is enlarged twice, the sense of resolution decreases by approximately half. According to the present exemplary embodiment, even if a part of a display image is enlarged by a loupe, it is possible to prevent the sense of resolution from being degraded.

Returning to FIG. 13, controller 210 generates management information of the partial enlarged image generated this time (hereinafter, referred to as "partial enlarged image management information" as appropriate) and stores the partial enlarged image management information in RAM 230 (S16). The partial enlarged image management information includes identification information about the partial enlarged image generated this time, a time of generation, and information about the corresponding touch position.

Controller 210 determines whether partial enlarged image data in which a predetermined time has elapsed since the time of generation is present in the partial enlarged image data. When such partial enlarged image data is present, the partial enlarged image data in which the predetermined time has elapsed and corresponding partial enlarged image management information are deleted (S17). Whether the partial enlarged image data in which the predetermined time has elapsed since the time of generation is present is determined by comparing the time of generation of the partial enlarged image management information stored in RAM 230 to a current time.

Controller 210 generates a composite image by compositing the partial enlarged image of the partial enlarged image data stored in RAM 230 with the base image based on the corresponding touch position included in the partial enlarged image management information and stores data of the composite image generated in RAM 230 (S18).

Controller 210 displays the composite image stored in RAM 230 on display part 110 (S19).

When it is determined at step S12 that the touch position is within the display area of the partial enlarged image (YES at S13), above-described step S19 is performed.

When it is determined at step S11 that the touch position information is not input (NO at S11), controller 210 determines whether rotating operation information is input from touch panel controller 130 (S20). That is to say, controller 210 determines whether a user performs a rotating operation on touch panel 120.

When it is determined that the rotating operation information is input (YES at S20), controller 210 determines whether a rotating operation position indicated by the rotating operation information is within the display area of the partial enlarged image (S21). That is to say, controller 210 determines whether the rotating operation is performed on the partial enlarged image. The rotating operation information includes information indicating a rotating operation position on touch panel 120.

When the rotating operation position is within the display area of the partial enlarged image (YES at S21), controller 210 reads data of the partial enlarged image subjected to the rotating operation from RAM 230 (S22).

Controller 210 generates an image by rotating the partial enlarged image data read and stores the partial enlarged image data generated in RAM 230 (S23). A rotating direction and a rotating amount are set based on the rotating operation information. For example, based on the rotating operation information, the rotating direction is set to counterclockwise or clockwise, whereas the rotating amount is set to 90 degrees or 180 degrees.

Controller 210 deletes the partial enlarged image data before rotation of the partial enlarged image subjected to the rotating operation this time and the partial enlarged image management information. At the same time, controller 210 stores partial enlarged image management information in which partial enlarged image data after rotation that is newly generated by this rotating operation, identification information of the new partial enlarged image data, a time of generation, and a corresponding touch position correspond to each other in RAM 230 (S24), and then performs processes at step S17 and subsequent steps.

Figure 15:
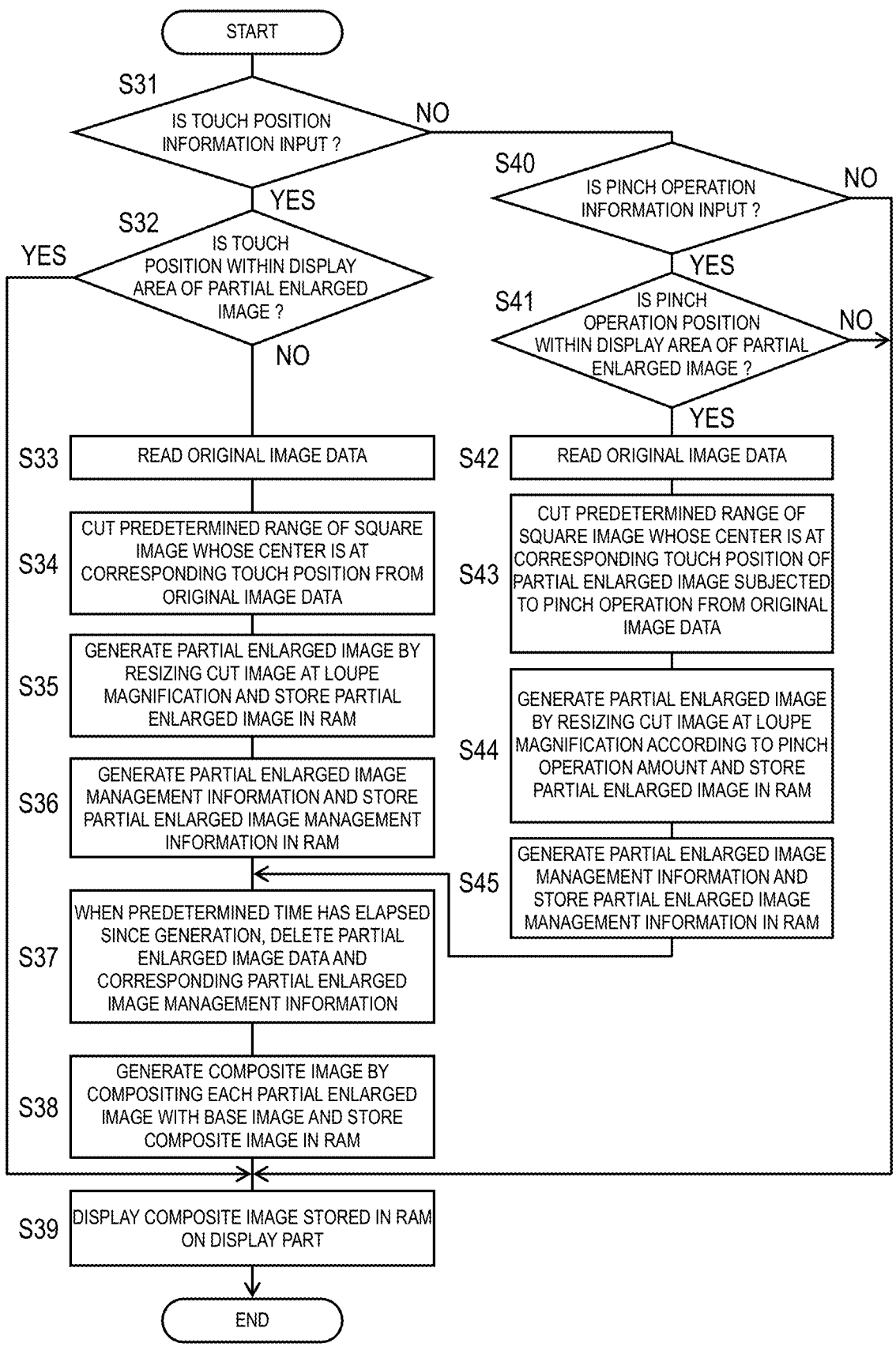
FIG. 15 is a flowchart of an example of an operation performed by the display device when a square loupe function is selected.

Next, an operation of display device 100 when the square loupe function is selected will be described. FIG. 15 is a flowchart of an example of the operation performed by display device 100 when the square loupe function is selected. At steps S31 to S33 and S35 to S39 of the flowchart illustrated in FIG. 15, similar processes to those at steps S11 to S13 and S15 to S19 of the flowchart of FIG. 13 are performed. A description will be mainly given of steps other than the similar steps.

At steps S31 to S33, controller 210 performs similar processes to those at steps S11 to S13 of FIG. 13. At step S34, controller 210 then calculates a corresponding touch position in original image data of a base image being displayed and cuts a predetermined range of a square image whose center is at the corresponding touch position from the original image data. At steps S35 to S39, controller 210 performs similar processes to those at steps S15 to S19 of FIG. 13.

When it is determined at step S31 that touch position information is not input (NO at S31), controller 210 determines whether pinch operation information is input from touch panel controller 130 (S40). That is to say, controller 210 determines whether a user performs a pinch operation on touch panel 120.

When it is determined that the pinch operation information is input (YES at S40), controller 210 determines whether a pinch operation position indicated by the pinch operation information is within a display area of a partial enlarged image (S41). That is to say, controller 210 determines whether the pinch operation is performed on the partial enlarged image. The pinch operation information includes information indicating a pinch operation position on touch panel 120.

When the pinch operation position is within the display area of the partial enlarged image (YES at S41), controller 210 reads original image data of the base image from memory 220 (S42).

Controller 210 cuts the predetermined range of the square image whose center is at the corresponding touch position on the partial enlarged image subjected to the pinch operation from the original image data (S43).

Controller 210 generates a partial enlarged image by resizing (enlarging) a cut image at a loupe magnification according to a pinch operation amount and stores data of the partial enlarged image generated in RAM 230 (S44).

Controller 210 generates management information of the partial enlarged image generated this time, stores the management information in RAM 230 (S45), and then performs processes at step S37 and subsequent steps. The partial enlarged image management information includes identification information about the partial enlarged image generated this time, a time of generation, and information about the corresponding touch position.

The present exemplary embodiment has described an example in which once a touch operation is performed on square loupe button Br, the square loupe function is continuously valid and a partial enlarged image is added every time the touch operation is performed on a screen. However, the present disclosure is not limited to this example. For example, when the touch operation is performed once on the screen after the square loupe function is validated and a partial enlarged image is displayed, unless the touch operation is performed again on square loupe button Br, two or more partial enlarged images may not be additionally displayed even if the touch operation is operated. This description may hold true for round loupe button Bc.

Even if one of a plurality of users using display device 100 rotates (for example, inverts or rotates ±90 degrees) the base image (for example, wide area map) while the partial enlarged image is displayed, controller 210 controls a direction of the partial enlarged image independently from a direction of the base image such that the direction of the partial enlarged image is not changed.

Second Exemplary Embodiment

A display device according to a second exemplary embodiment will be described. In the square loupe function of display device 100 according to the first exemplary embodiment, when a user performs a pinch operation within a partial enlarged image, a predetermined range of a square image whose center is at a corresponding touch position is cut and a loupe magnification is changed according to a pinch operation amount. Meanwhile, in the second exemplary embodiment, a range to be cut (enlarged) is changed depending on the pinch operation amount and a cut image is enlarged at a fixed loupe magnification. Differences from display device 100 according to the first exemplary embodiment will be mainly described below.

Figure 16A:
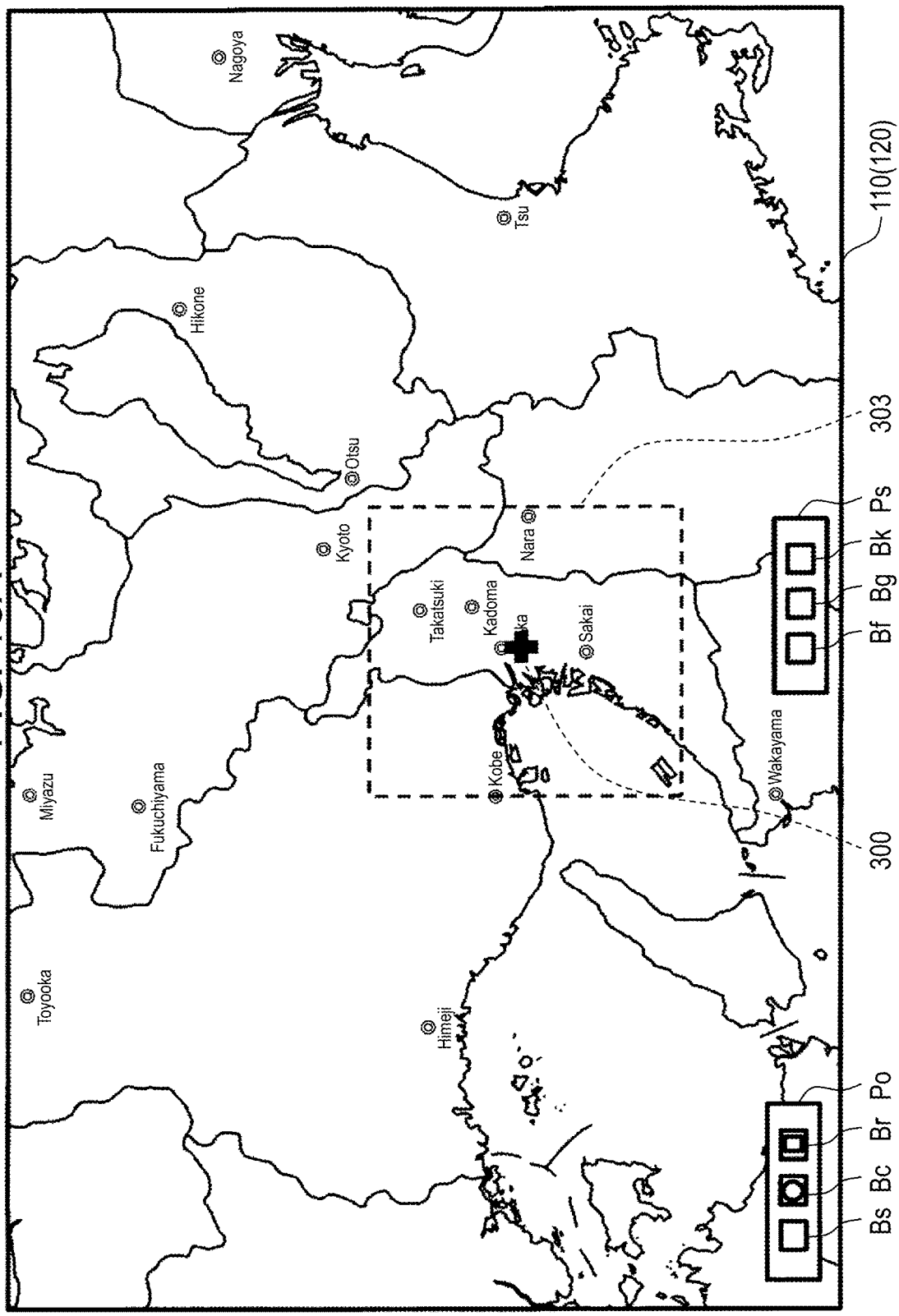
FIG. 16A illustrates an example of a display screen of a display device according to a second exemplary embodiment.

FIGS. 16A and 16B illustrate examples of a display screen of the display device according to the second exemplary embodiment. When the square loupe function is validated and in the display state of FIG. 8B for example, if a user performs a pinch-out operation (pinch operation) within a display area of partial enlarged image 501, controller 210 enlarges enlargement target area 302 described in FIG. 8A to enlargement target area 303 illustrated in FIG. 16A according to a pinch operation amount and determines enlargement target area 303. Controller 210 cuts an image corresponding to enlargement target area 303 enlarged from an original image and displays partial enlarged image 504 generated by enlarging the cut image at a fixed loupe magnification so as to be superimposed on a base image, as illustrated in FIG. 16B.

Figure 17:
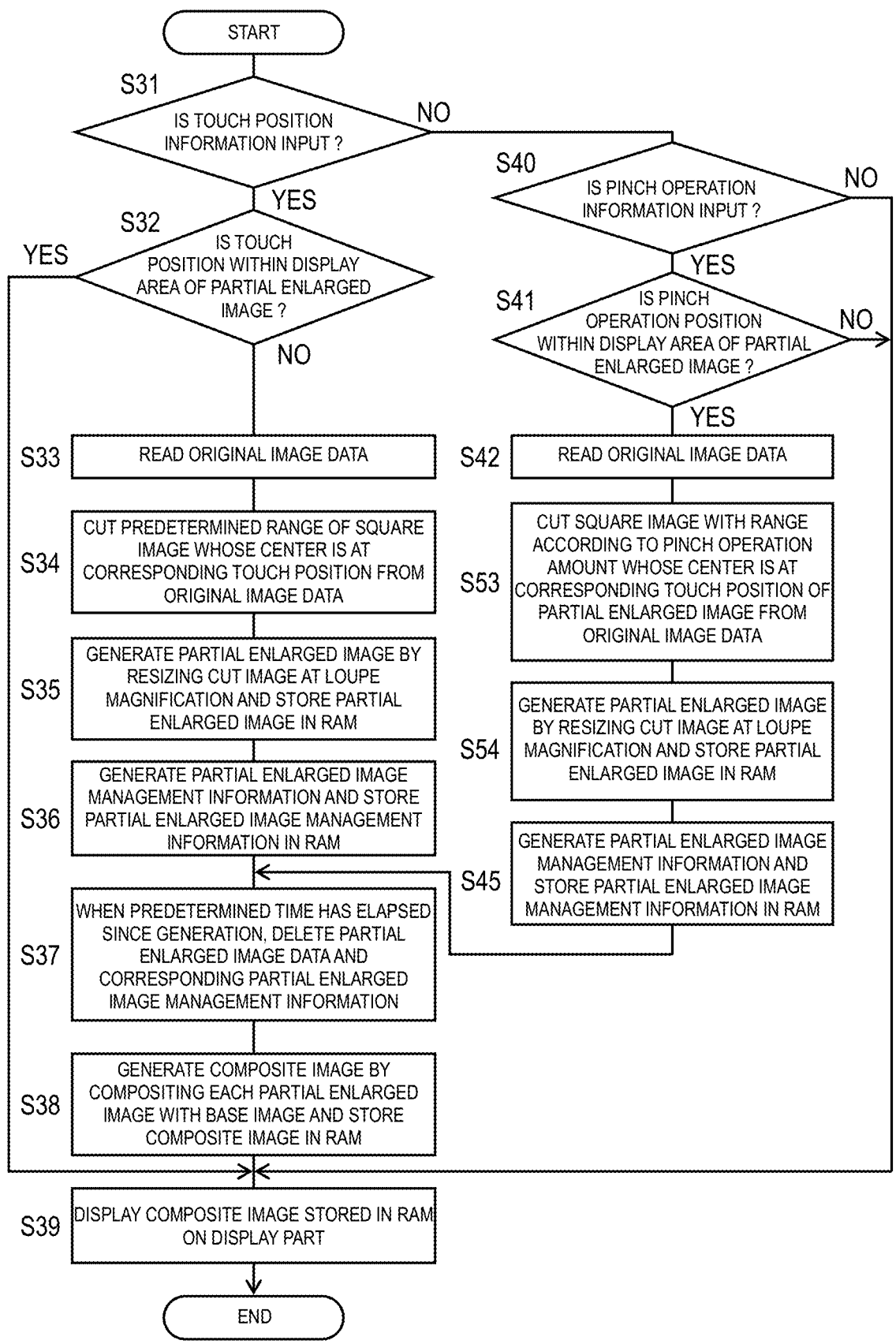
FIG. 17 is a flowchart of an example of an operation performed by the display device according to the second exemplary embodiment when the square loupe function is selected.

FIG. 17 is a flowchart of an example of an operation performed by display device 100 according to the second exemplary embodiment when the square loupe function is selected.

In the flowchart of FIG. 17, steps S53 and S54 are provided instead of steps S43 and S44 of the flowchart illustrated in FIG. 15. At other steps, similar processes to those of the flowchart illustrated in FIG. 15 are performed.

When original image data is read from storage 220 at step S42 of FIG. 17, controller 210 cuts a square image with a range according to an operation amount of a pinch operation whose center is at a corresponding touch position on a partial enlarged image subjected to the pinch operation from the original image data (S53).

Controller 210 generates a partial enlarged image by resizing (enlarging) a cut image at a fixed loupe magnification and stores data of the partial enlarged image generated in RAM 230 (S54).

Third Exemplary Embodiment

A third exemplary embodiment provides a display device including two types of square loupe functions described in the first exemplary embodiment and the second exemplary embodiment. That is to say, the display device according to the third exemplary embodiment is configured to arrange two square loupe buttons for two types of the square loupe functions on a loupe operation panel and to perform one of the flowcharts illustrated in FIGS. 15 and 17 in response to a square loupe button operated.

Fourth Exemplary Embodiment

Figure 18:
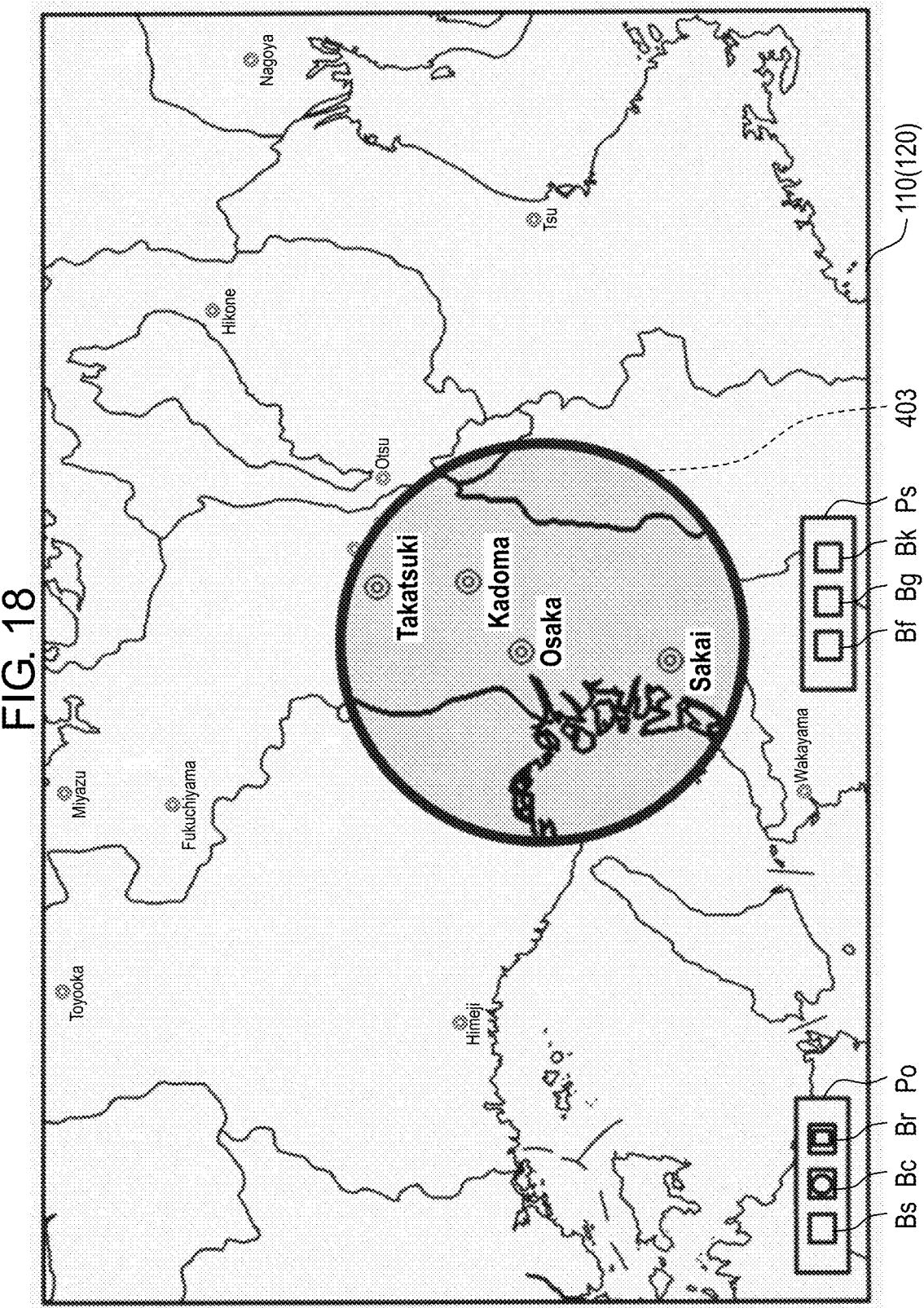
FIG. 18 illustrates an example of a display screen of a display device according to a fourth exemplary embodiment.

FIG. 18 illustrates an example of a display screen of a display device according to a fourth exemplary embodiment. As illustrated in FIG. 18, partial enlarged image 403 displayed on the display screen is subjected to the resize processing described above and color conversion processing. The color conversion processing is processing of converting a color and/or a brightness of a partial enlarged image to a color and/or a brightness different from that of a base image. Only with a touch operation of displaying a partial enlarged image, the color and/or the brightness of the partial enlarged image can be automatically changed to a color and/or a brightness suitable for a part. The base image is a map image in the example of FIG. 18. However, the base image may be a pathological diagnosis image. In such a case, a focal site can be enlarged and at the same time, its color can be automatically changed to a color suitable for diagnosing the focal site.

Fifth Exemplary Embodiment

A display device according to a fifth exemplary embodiment can display a partial enlarged image on a display screen as an image subjected to the resize processing described in the above exemplary embodiments and contrast enhancement processing. Consequently, even if an enlargement magnification of the partial enlarged image increases, the partial enlarged image can be a sharp image.

Sixth Exemplary Embodiment

Figure 19:
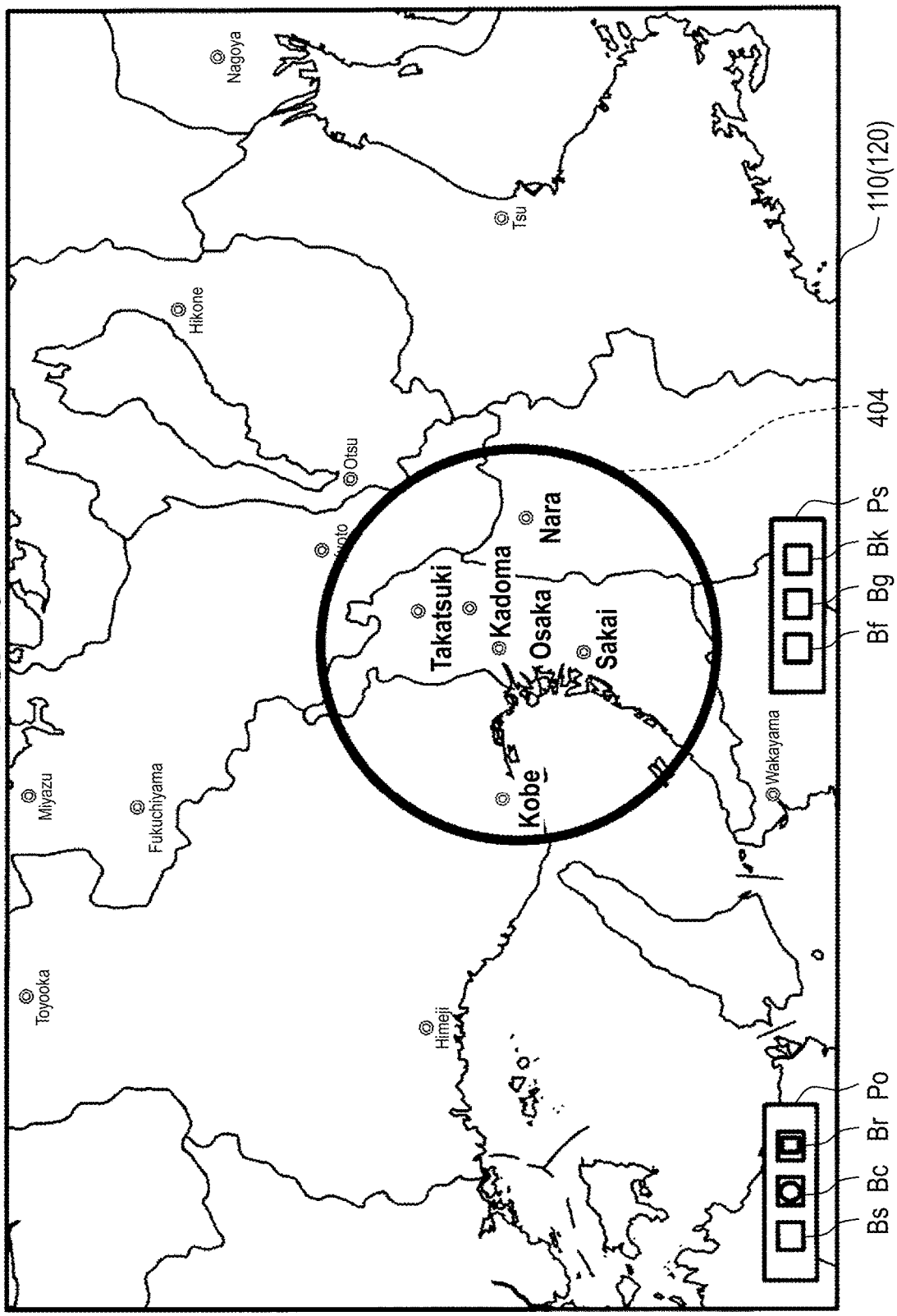
FIG. 19 illustrates an example of a display screen of a display device according to a sixth exemplary embodiment.

FIG. 19 illustrates an example of a display screen of a display device according to a sixth exemplary embodiment. The first to fifth exemplary embodiments have described a case where a partial enlarged image is an image obtained by uniformly enlarging an image in an enlargement target area of a base image. However, an enlargement target object may be detected from the enlargement target area by an image recognition technique, partial enlarged image data in which only the enlargement target object detected is enlarged may be generated, and the partial enlarged image data may be displayed so as to be superimposed on the base image. In this case, controller 210 generates partial enlarged image 404 by resizing an area corresponding to an enlargement target object in an original image. Specific examples of the enlargement target object include a character, a symbol, a face, and an area with a predetermined color that are displayed on a display screen. FIG. 19 illustrates a display example when the enlargement target object is a character. As illustrated in FIG. 19, characters included in the enlargement target area may be detected by image recognition, partial enlarged image data in which only the characters detected are enlarged may be generated, and the partial enlarged image data may be displayed so as to be superimposed on the base image. In a map and the like, characters and symbols are sometimes configured by font data independently from an image. In such a case, font data included in the enlargement target area may be detected and a display size of characters indicated by the font data may be increased.

Seventh Exemplary Embodiment

In the first exemplary embodiment, when a rotating operation using two fingers is performed in a display area of a circular partial enlarged image, the partial enlarged image subjected to the rotating operation is rotated by a predetermined angle according to a rotating direction and a rotating amount of the rotating operation. However, in displaying circular partial enlarged image 401 as illustrated in FIG. 20, rotating operation buttons may be displayed near partial enlarged image 401. In an example of FIG. 20, 90-degree counterclockwise rotation button B-90 for 90 degrees counterclockwise rotation, 90-degree clockwise rotation button B90 for 90 degrees clockwise rotation, and 180-degree rotation button B180 for 180 degrees rotation are displayed at an upper right portion of circular partial enlarged image 401. When a user touches any of the rotation buttons with one finger (for example, middle finger) while touching an area of partial enlarged image 401 with another finger (for example, index finger), controller 210 rotates partial enlarged image 401 by an angle corresponding to the rotation button touched. Fingers other than the fingers described above may be used.

Eighth Exemplary Embodiment

In the first exemplary embodiment, when a user performs a rotating operation on a partial enlarged image with two fingers, the user can rotate and display the partial enlarged image so as to easily view the partial enlarged image. In an eighth exemplary embodiment, by using a touch pen, the partial enlarged image is displayed in a state of being rotated so as to be easily viewed without requiring a rotating operation using fingers and an operation of touching a rotation button. Specifically, different IDs are given to different touch pens that are respectively used for four sides of display device 100 (see FIG. 1) and information in which each of the four side of display device 100 corresponds to each of the IDs of the touch pens is stored in storage 220. The touch pen also has a function of outputting a wireless signal including ID information when touching a screen.

A user uses a touch pen corresponding to a side of a display device at which the user operates the display device. When controller 210 of display device 100 detects a touch operation with the touch pen on touch panel 120, that is, when controller 210 receives a wireless signal including ID information at a time of the touch operation, controller 210 displays a partial enlarged image based on the ID information such that the user can view the partial enlarged image correctly from the side corresponding to the touch pen. For example, when the side corresponding to the touch pen for the touch operation is an upper side of a base image, the partial enlarged image is inverted vertically with respect to the base image and displayed. Meanwhile, when the side corresponding to the touch pen for the touch operation is a lower side of the base image, the partial enlarged image is displayed so as to vertically match the base image. When the partial enlarged image is displayed, as described in the seventh exemplary embodiment, 90-degree counterclockwise rotation button B-90, 90-degree clockwise rotation button B90, and 180-degree rotation button B180 may be displayed.

Ninth Exemplary Embodiment

A rotating operation on a display direction of a partial enlarged image and on the partial enlarged image may be performed by analyzing an image captured by an imaging device such as a camera. Specifically, cameras are disposed at four corners of display device 100 (see FIG. 1), and the cameras capture images of a screen of display part 110 from above to generate image data. The image data generated by the cameras is stored in a storage. When touch position information is input from touch panel controller 130 to controller 210, controller 210 reads image data generated by the cameras at the time of a touch operation relating to the touch position information for analysis, determines from which side of the four sides of display device 100 the touch operation is performed based on the image analysis, and displays the partial enlarged image so as to be viewed from the side. When the touch position is within an area of the partial enlarged image that is already displayed, the partial enlarged image is rotated and displayed so as to be viewed from the side determined by the image analysis.

In the image analysis, an image of the touch position from above at the time of the touch operation may be analyzed to detect a direction of a user's hand or a user's finger and determine a side relating to the touch operation. Alternatively, the side relating to the touch operation may be determined by analyzing images of the touch position from above before and after the touch operation and detecting a movement direction of the user's hand or the user's finger. When the user uses a touch pen, the side relating to the touch operation may be determined by detecting an angle of the touch pen from an image at the time of the touch operation or by detecting the movement direction of the touch pen from images before and after the touch operation. The cameras do not need to be disposed at all the four corners of display device 100 and may be disposed diagonally.

Overall Summary of Exemplary Embodiments (Problems and Measures)

In a meeting or a presentation using a display device disposed flat on a table, a plurality of people view a display screen from four sides (up, down, left, and right) of the display device. A display device with a display resolution of 8K can display a list and details of information such as a wide area map and a large drawing at a high resolution. However, fonts of characters are reduced and thus there is a need for partial enlargement.

1. Improving Image Quality of Partial Enlarged Image Displayed by Loupe Function
(Problem)

When an ultra-high definition original image with a resolution of 20K is entirely displayed as a base image on a display part with a resolution of 8K, the original image with a resolution of 20K is resized (scaled) so as to have a resolution suitable for the resolution of the display part, or 8K for display. In this case, filtering is applied to the original image. When partial enlargement is performed using a loupe function, if a partial enlarged image is generated from the base image, the partial enlarged image generated has been subjected to resizing and filtering twice based on the original image. As artifacts are generated by performing resizing plural times, image quality is degraded.

Present Exemplary Embodiment

The display device according to the present exemplary embodiment generates a partial enlarged image not from a base image after resizing (scaling) but from an original image. As the partial enlarged image generated has been subjected to resizing and filtering only once based on the original image, degradation of the image quality is prevented. When original image data has a higher resolution than a display, an amount of information of the original image is large and thus the partial enlarged image generated has higher image quality due to its larger size as compared to the case of generating the partial enlarged image from the base image. Also when the original image data has a lower resolution than the display, resizing and filtering are performed once based on the original image, and thus the partial enlarged image generated has higher image quality as compared to the case of generating the partial enlarged image from the base image.

2. Display of Plurality of Partial Enlarged Images by Plurality of Loupes
(Problem)

In generating a partial enlarged image, if a base image displayed on a display part is entirely resized and then partial enlargement is performed, resize processing is also performed on an area other than a partially enlarged area, which leads to an increase in a processing load. In particular, in displaying a plurality of partial enlarged images (e.g., 10 or more partial enlarged images) by a plurality of loupes, if processing of resizing the entire base image is performed a plurality of times, the load may extremely increase, a processing speed of the entire display device may decrease, and the display device may hang up.

Present Exemplary Embodiment (1) The display device according to the present exemplary embodiment cuts only a partial enlargement target area from an original image and then performs the resize processing on the partial enlargement target area. An amount of data of the original image is larger than that of a base image but the amount of data of the cut part is much less than that of the base image. It is thus possible to significantly reduce the processing load of controller 210 (personal computer (PC)/GPU) in the resize processing. The load of the processing using loupes is also reduced as compared to a case of resizing the entire base image. It is thus possible to improve a processing speed and prevent a hang up of the device.

(2) When a plurality of partial enlarged image are displayed, the display device according to the present exemplary embodiment sequentially erases the partial enlarged images after a predetermined time (for example, 10 sec) has elapsed since start of display of the partial enlarged images. A load of parallel processing is thus reduced and visibility of an entire display screen is improved.

(3) The display device according to the present exemplary embodiment provides two types of loupes, that is, a round loupe with a fixed loupe magnification and a square loupe with a variable loupe magnification and a variable display area. The processing load of the square loupe with a variable loupe magnification and a variable display area is larger than that of the round loupe with a fixed loupe magnification in real time. However, with processing (1), (2) described above, it is possible to significantly reduce the processing load of square loupe processing.

(4) It is assumed that the partial enlarged image is applied to not only a still image but also a moving image. In a case of the moving image, the display device according to the present exemplary embodiment requires processing on a frame basis. However, with the processing (1), (2) described above, it is possible to reduce the processing load and appropriately perform the square loupe processing.

3. Rotating Processing of Display within Loupe (Problem)

In conventional partial enlargement, a partial enlarged image is operated or a displayed only in the same direction as that of a base image. Consequently, when a plurality of people use the table-type display according to the present exemplary embodiment while surrounding the display on all sides, it is difficult for the people to view a base image and a partial enlarged image.

Present Exemplary Embodiment (1) The display device according to the present exemplary embodiment can rotate (for example, invert or rotate ±90 degrees) a partial enlarged image. Consequently, a user can view the partial enlarged image at a user's position in an appropriate direction. If a plurality of users perform a partial enlargement operation on different positional ranges, the direction of each of the positional ranges can be changed independently.

(2) Only when a rotating operation is performed within an area of a partial enlarged image in a round loupe by a plurality of fingers, the display device according to the present exemplary embodiment rotates the partial enlarged image. Specifically, when a plurality of fingers (two fingers) are touched within the area of the partial enlarged image in the round loupe, a rotating direction (clockwise or counterclockwise) is detected based on a positional shift between a finger functioning as a rotating shaft (support) and a finger indicating a rotating direction and the partial enlarged image is rotated in response to the instruction.

(3) The display device according to the present exemplary embodiment displays not only the partial enlarged image in the round loupe but also a plurality of rotating operation buttons for rotating the partial enlarged image. When the partial enlarged image and any of the rotating operation buttons are touched by two fingers, the partial enlarged image is rotated by an angle according to the rotating operation button thus touched.

(4) Other than the operations using fingers described in (2), (3), the display device according to the present exemplary embodiment uses a touch pen whose usage position on a table is defined (ID is given to each touch pen) to automatically change the direction of the partial enlarged image to the direction of a user.

(5) Even if one of a plurality of users rotates (for example, inverts or rotates ±90 degrees) a base image (for example, wide area map) while the partial enlarged image is displayed, the display device according to the present exemplary embodiment controls the display direction of the partial enlarged image independently from the direction of the base image such that the direction of the partial enlarged image is not changed.

[Effects and Others]

Display device 100 according to the present exemplary embodiment includes display part 110, storage 220 that stores original image data of an original image, touch panel controller 130 (detector) that outputs, when a touch operation is performed on a screen of display part 110, touch position information indicating a touch position corresponding to the touch operation, and controller 210 that generates a base image by resizing the original image according to a display resolution of display part 110 and displays the base image on the display part. When the touch position information is output from touch panel controller 130, controller 210 determines an enlargement target area that is an area on the base image and includes a position corresponding to the touch position, resizes and cuts an area on the original image corresponding to the enlargement target area to generate a partial enlarged image in which the enlargement target area is enlarged, and composites the partial enlarged image generated with the base image and displays a composite image on display part 110.

The partial enlarged image is generated by resizing and cutting the area on the original image corresponding to the enlargement target area. Consequently, it is possible to prevent image quality from degrading even if a partial area of an image is enlarged and superimposed on the image for display.

According to the present exemplary embodiment, in generating the partial enlarged image, controller 210 cuts an area corresponding to the enlargement target area from the original image and then resizes an image of the cut area. In generating the partial enlarged image, the area corresponding to the enlargement target area is cut from the original image and then the image of the cut area is resized. It is thus possible to reduce a processing load of controller 210 as compared to a case of resizing the entire original image. Consequently, it is possible to perform parallel processing at high speed and improve operational responsibility.

According to the present exemplary embodiment, when a rotating operation is performed on a screen of display part 110 by a multi-touch, touch panel controller 130 outputs rotating operation information indicating a rotating center position, a rotating direction, and a rotating amount. When the rotating operation information is output from touch panel controller 130 and the rotating center position is within a display area of the partial enlarged image, controller 210 rotates the partial enlarged image based on the rotating direction and the rotating amount. A user of display device 100 can thus rotate the partial enlarged image so as to easily view an image or a character.

According to the present exemplary embodiment, when a plurality of pieces of touch position information are simultaneously or sequentially output from touch panel controller 130, controller 210 generates the partial enlarged image for each piece of the touch position information, composites the partial enlarged image generated with the base image, and displays a composite image. The partial enlarged image can thus be displayed for each of a plurality of touch positions. The present disclosure can handle a case where the display device is used by a lot of people and a case where there is a need to simultaneously display partial enlarged images at a plurality of positions.

According to the present exemplary embodiment, when a predetermined time has elapsed since the touch position information has been output, controller 210 erases the partial enlarged image corresponding to the touch position information. Consequently, it is possible to perform parallel processing at high speed and improve the operational responsibility. It is also possible to improve user's visibility on a display screen.

According to the present exemplary embodiment, when a rotating operation is performed on a screen of display part 110 by a multi-touch, touch panel controller 130 outputs rotating operation information indicating a rotating center position, a rotating direction, and a rotating amount. When the rotating operation information is output from touch panel controller 130 and the rotating center position is within a display area of any of partial enlarged images, controller 210 rotates the partial enlarged image at which the rotating center position is located based on the rotating direction and the rotating amount. Each user of display device 100 can thus rotate the partial enlarged image so as to easily view an image or a character.

According to the present exemplary embodiment, controller 210 performs color conversion processing on the partial enlarged image so as to cause at least one of a color and a brightness to be different from the base image. The color and/or the brightness of the partial enlarged image can thus be converted to a color and/or a brightness suitable for a content and it is possible to improve visual recognizability of the content of the partial enlarged image.

According to the present exemplary embodiment, controller 210 performs contrast enhancement processing on the partial enlarged image. It is thus possible to improve the visual recognizability of the content of the partial enlarged image.

Display device 100 according to the present exemplary embodiment includes display part 110, a storage that stores original image data of an original image, touch panel controller 130 (detector) that outputs, when a touch operation is performed on a screen of display part 110, touch position information indicating a touch position corresponding to the touch operation, and controller 210 that generates a base image by resizing the original image according to a display resolution of display part 110 and displays the base image on the display part. When the touch position information is output from touch panel controller 130, controller 210 determines an enlargement target object that is included in an enlargement target area that is an area on the base image and includes a position corresponding to the touch position, resizes and cuts a part that is an area on the original image and corresponds to the enlargement target object to generate a partial enlarged image in which the enlargement target object is enlarged, and composites the partial enlarged image generated with the base image and displays a composite image on display part 110.

The partial enlarged image is generated by resizing and cutting the part that is the area on the original image corresponding to the enlargement target object and is included in an area corresponding to the enlargement target area. Consequently, it is possible to prevent image quality from degrading even if a partial area of an image is enlarged and superimposed on the image for display.

According to the present exemplary embodiment, the enlargement target object is at least one of a character, a symbol, a face, and an image indicating an area of a predetermined color. It is thus possible to enlarge the character, the symbol, the face, and the image indicating the area of the predetermined color while preventing degradation in image quality.

According to the present exemplary embodiment, the original image has a resolution larger than a display resolution of display part 110. It is thus possible to generate a partial enlarged image with high definition in the partial enlarged image.

According to the present exemplary embodiment, the screen of display part 110 is disposed to face vertically upward. When display device 100 whose display part 110 is disposed flat is used by a plurality of users, some users may view a base image upside down. However, according to the present exemplary embodiment, by rotating a partial enlarged image, each user can easily view the partial enlarged image.

According to the present exemplary embodiment, the display device is configured as a stationary table, and display part 110 is disposed on a top surface of a top board of the stationary table. When display device 100 is configured as the stationary table and is used by a plurality of users, some users may view a base image upside down. However, according to the present exemplary embodiment, by rotating a partial enlarged image, each user can easily view the partial enlarged image.

Other Exemplary Embodiments

The present disclosure is not limited to the exemplary embodiments described above, and various modifications and changes are possible without departing from the spirit of the present disclosure.

(1) The above exemplary embodiments have described an example of using the display device according to the present disclosure as a table type display device. However, the display device according to the present disclosure is not limited to the table type display device and is applicable to any display device with a touch panel. For example, the display device according to the present disclosure is widely applicable to a smartphone, a tablet computer, a notebook computer, a desktop computer, a television, and other display devices. Regarding the size of a screen of a display part, display devices with a screen ranging from 10 inches to 50 inches can be widely used.

(2) When the display device according to the present disclosure is configured as a relatively large tablet computer ranging from approximately 20 inches to 50 inches in size as described above, the display device may be disposed flat such that a screen of a display part faces vertically upward or may be disposed flat such that the screen of the display part faces diagonally upward. When the display device is disposed flat such that the screen faces vertically upward, the display device can be operated by several people surrounding all four sides of the screen. When the display device is disposed flat such that the screen of the display part faces diagonally upward, the display device can be operated by several people surrounding three sides (lower side and left and right sides) of the screen.

(3) Table type display device 100 according to the above exemplary embodiments is disposed flat such that a screen of a display part faces upward. For example, however, a top board of a table may be disposed diagonally. Consequently, display device 100 is disposed flat such that the screen faces diagonally upward.

(4) The above exemplary embodiments have described a case where a base image is a map. However, the base image is not limited to a map image in the present disclosure. For example, the base image may be a picture image, an image of a Web browser screen, or an image of an application screen such as a computer graphics (CG) viewer or computer-aided design (CAD).

(5) The above exemplary embodiments have described a display device in which a display resolution of a display part is 8K. However, the present disclosure is applicable to a display device in which the display resolution of the display part is less than or equal to 4K such as 4K and 2K (full high definition (FHD)) or a display device in which the display resolution of the display part is larger than 8K such as 16K and 20K. Even if the display resolution of the display part is less than or equal to 4K, it is possible to achieve a partial enlargement effect according to a display content, a content of display, a screen size, and a purpose. When the display resolution of the display part is larger than 8K, a display target on the screen tends to be reduced by increasing definition, and thus the partial enlargement effect is enhanced.

(6) The above exemplary embodiments have described a case where an original image is a 20K image. It is needless to mention that the present disclosure is applicable to a case where the original image is larger than 20K and a case where the original image is a less than 20K.

(7) In the above exemplary embodiments, when a round loupe function is validated, a partial enlarged image can be rotated by a rotating operation, and when a square loupe function is validated, the partial enlarged image can be enlarged by a pinch operation. However, when the round loupe function is validated, the partial enlarged image can be enlarged by the pinch operation, and when the square loupe function is validated, the partial enlarged image can be rotated by the rotating operation.

As described above, the exemplary embodiments and other exemplary embodiments considered to be best modes have been provided by the attachment drawings and the detailed description. The attached drawings and the detailed description have been provided to exemplify the subject matter described in the claims with reference to specific exemplary embodiments for those skilled in the art. Therefore, various changes, replacements, additions, omissions, and the like may be made to the above exemplary embodiments within the scope of the claims and equivalents thereof.

INDUSTRIAL APPLICABILITY

The present disclosure is widely applicable to a display device that enlarges a partial area of an image displayed on a screen and superimposes the partial area on the image for display (for example, liquid crystal display and organic EL display).

What is claimed is:
1. A display device comprising:
a display part;
a storage that stores original image data of an original image;
a detector that detects a touch operation being performed on a screen of the display part, and outputs touch position information indicating a touch position corresponding to the touch operation; and
a controller that generates a base image by resizing the original image according to a display resolution of the display part and displays the base image on the display part, wherein
when the touch operation is detected by the detector, the controller:
determines an enlargement target area that is a part of area on the base image including a position corresponding to the touch position,
resizes and cuts an area on the original image to generate a partial enlarged image in which the enlargement target area is enlarged, the area corresponding to the enlargement target area, and
display on the display part, the base image and the partial enlarged image which is displayed over a part of the base image,
when a rotating operation is performed on a screen of the display part by a multi-touch, the detector outputs rotating operation information indicating a rotating center position, a rotating direction, and a rotating amount of the rotating operation, and
when the rotating operation information is output from the detector and the rotating center position is within a display area of the partial enlarged image, the controller rotates the partial enlarged image with respect to the base image based on the rotating direction and the rotating amount.

2. The display device according to claim 1, wherein in generating the partial enlarged image, the controller cuts an area from the original image and then resizes an image of the cut area, the area corresponding to the enlarged target area.

3. The display device according to claim 1, wherein when a plurality of pieces of touch position information are simultaneously or sequentially output from the detector, the controller generates the partial enlarged image for each piece of the touch position information, composites the partial enlarged image generated with the base image to generate a composite image, and displays the composite image.

4. The display device according to claim 1, wherein when a predetermined time has elapsed since the touch position information has been output, the controller erases the partial enlarged image corresponding to the touch position information.

5. The display device according to claim 1, wherein
when a rotating operation is performed on a screen of the display part by a multi-touch, the detector outputs rotating operation information indicating a rotating center position, a rotating direction, and a rotating amount of the rotating operation, and
when the rotating operation information is output from the detector and the rotating center position is within a display area of any of partial enlarged images, the controller rotates the partial enlarged image at which the rotating center position is located based on the rotating direction and the rotating amount.

6. The display device according to claim 1, wherein the controller performs color conversion processing on the partial enlarged image so as to cause at least one of a color and a brightness to be different from the base image.

7. The display device according to claim 1, wherein the controller performs contrast enhancement processing on the partial enlarged image.

8. The display device according to claim 1, wherein the original image has a resolution larger than a display resolution of the display part.

9. The display device according to claim 1, wherein the screen of the display part is disposed to face vertically upward or diagonally upward.

10. The display device according to claim 9 configured as a stationary table, wherein
the display part is disposed on a top surface of a top board of the stationary table.

11. The display device according to claim 1 having a shape of a tablet, wherein
the screen of the display part is disposed to face vertically upward or diagonally upward.

12. A display device comprising:
a display part;
a storage that stores original image data of an original image;
a detector that outputs, when a touch operation is performed on a screen of the display part, touch position information indicating a touch position corresponding to the touch operation; and
a controller that generates a base image by resizing the original image according to a display resolution of the display part and displays the base image on the display part, wherein
when the touch position information is output from the detector, the controller
determines an enlargement target object that is included in an enlargement target area that is an area on the base image and includes a position corresponding to the touch position,
resizes and cuts a part that is an area on the original image and corresponds to the enlargement target object to generate a partial enlarged image in which the enlargement target object is enlarged, and
composites the partial enlarged image generated with the base image to generate a composite image, and displays the composite image on the display part,
when a rotating operation is performed on a screen of the display part by a multi-touch, the detector outputs rotating operation information indicating a rotating center position, a rotating direction, and a rotating amount of the rotating operation, and
when the rotating operation information is output from the detector and the rotating center position is within a display area of the partial enlarged image, the controller rotates the partial enlarged image with respect to the base image based on the rotating direction and the rotating amount.

13. The display device according to claim 12, wherein the enlargement target object is an image indicating at least one of a character, a symbol, a face, and an area of a predetermined color.

14. The display device according to claim 12, wherein when a plurality of pieces of touch position information are simultaneously or sequentially output from the detector, the controller generates the partial enlarged image for each piece of the touch position information, composites the partial enlarged image generated with the base image to generate a composite image, and displays the composite image.

15. The display device according to claim 12, wherein when a predetermined time has elapsed since the touch position information has been output, the controller erases the partial enlarged image corresponding to the touch position information.

16. The display device according to claim 12, wherein
when a rotating operation is performed on a screen of the display part by a multi-touch, the detector outputs rotating operation information indicating a rotating center position, a rotating direction, and a rotating amount of the rotating operation, and
when the rotating operation information is output from the detector and the rotating center position is within a display area of any of partial enlarged images, the controller rotates the partial enlarged image at which the rotating center position is located based on the rotating direction and the rotating amount.

17. The display device according to claim 12, wherein the controller performs color conversion processing on the partial enlarged image so as to cause at least one of a color and a brightness to be different from the base image.

18. The display device according to claim 12, wherein the controller performs contrast enhancement processing on the partial enlarged image.

19. The display device according to claim 12, wherein the original image has a resolution larger than a display resolution of the display part.

20. The display device according to claim 12, wherein the screen of the display part is disposed to face vertically upward or diagonally upward.

21. The display device according to claim 20 configured as a stationary table, wherein
the display part is disposed on a top surface of a top board of the stationary table.

22. The display device according to claim 12 having a shape of a tablet, wherein
the screen of the display part is disposed to face vertically upward or diagonally upward.

* * * * *